US012657991B2

(12) United States Patent
Hirai et al.

(10) Patent No.: US 12,657,991 B2

(45) **Date of Patent: *Jun. 16, 2026**

(54) GAMING MACHINE, CONTROL METHOD FOR MACHINE, AND PROGRAM FOR GAMING MACHINE

(71) Applicant: Konami Gaming, Inc., Las Vegas, NV (US)

(72) Inventors: Tomoaki Hirai, Las Vegas, NV (US); Yuji Taniguchi, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,100

(22) Filed: Feb. 27, 2024

(65) Prior Publication Data

US 2024/0321038 A1 Sep. 26, 2024

Related U.S. Application Data

(63) Continuation of application No. 17/185,702, filed on Feb. 25, 2021, now Pat. No. 11,989,998, which is a continuation of application No. 15/261,551, filed on Sep. 9, 2016, now Pat. No. 10,970,958.

(51) Int. Cl.
*G07F 17/32* (2006.01)
*G07F 17/34* (2006.01)

(52) U.S. Cl.
CPC ...... *G07F 17/3213* (2013.01); *G07F 17/3209* (2013.01); *G07F 17/3246* (2013.01); *G07F 17/34* (2013.01)

(58) Field of Classification Search
CPC ............ G07F 17/3213; G07F 17/3209; G07F 17/3246; G07F 17/34
See application file for complete search history.

(56) References Cited

U.S. PATENT DOCUMENTS

| | | | | |
|---|---|---|---|---|
| 4,421,310 A | 12/1983 | Williams | | |
| 5,251,897 A | 10/1993 | Fulton | | |
| 2001/0038178 A1* | 11/2001 | Vancura | G07F 17/3244 | 273/274 |
| 2003/0017865 A1* | 1/2003 | Beaulieu | G07F 17/3213 | 463/16 |
| 2003/0050111 A1* | 3/2003 | Saffari | G07F 17/3255 | 463/25 |
| 2003/0064800 A1* | 4/2003 | Jackson | G07F 17/3209 | 463/16 |

(Continued)

*Primary Examiner* — Jeffrey K Wong
(74) *Attorney, Agent, or Firm* — Howard & Howard Attorneys PLLC

(57) ABSTRACT

A gaming machine that provides an operation unit, a display unit, and a control unit. The operation unit receives an operation of a player. The display unit displays a rotating selector device including a plurality of cells arranged in a grid. The grid has a column and a plurality of rows. A reel strip having a plurality of segments is associated with the column. Each segment has a plurality of segment symbol positions. Each segment symbol position having an associated symbol. During a game, the control unit displays and rotates the selector device and establishes a stop segment based on the timing of player input. The control unit select a symbol position of the stop segment to establish an outcome of the game.

15 Claims, 17 Drawing Sheets

(56) References Cited

U.S. PATENT DOCUMENTS

| | | | | |
|---|---|---|---|---|
| 2003/0195037 | A1* | 10/2003 | Vuong | G07F 17/32 463/29 |
| 2004/0082384 | A1 | 4/2004 | Walker et al. | |
| 2006/0100019 | A1* | 5/2006 | Hornik | G07F 17/3206 463/42 |
| 2006/0160624 | A1 | 7/2006 | Slomiany et al. | |
| 2007/0057464 | A1* | 3/2007 | Cockrell | A63F 1/00 273/303 |
| 2008/0242421 | A1* | 10/2008 | Geisner | A63F 13/75 463/42 |
| 2009/0227357 | A1 | 9/2009 | Rasmussen | |
| 2010/0203948 | A1* | 8/2010 | Falciglia, Sr. | G07F 17/3265 463/20 |
| 2012/0004033 | A1* | 1/2012 | Lyons | G07F 17/3211 715/702 |
| 2012/0064961 | A1* | 3/2012 | Vancura | G07F 17/3265 463/20 |
| 2012/0122550 | A1 | 5/2012 | Johnson et al. | |
| 2012/0270631 | A1 | 10/2012 | Graves et al. | |
| 2013/0296018 | A1* | 11/2013 | Aida | G07F 17/34 463/20 |
| 2013/0331184 | A1 | 12/2013 | Kelly et al. | |
| 2014/0080576 | A1 | 3/2014 | Hoffman et al. | |
| 2015/0235511 | A1 | 8/2015 | Zoble et al. | |
| 2015/0364001 | A1 | 12/2015 | Wotton et al. | |
| 2016/0063799 | A1* | 3/2016 | Reeves | G07F 17/326 463/17 |
| 2016/0217646 | A1* | 7/2016 | Hornik | G07F 17/3213 |
| 2016/0358424 | A1* | 12/2016 | Thomas | G07F 17/3272 |
| 2018/0130285 | A1* | 5/2018 | Ang | G07F 17/3244 |

* cited by examiner

| Segment | | Stop position | | | | |
|---|---|---|---|---|---|---|
| | | Prize (in cents) | | Weight | Chance | Ave. Win |
| 1 | RTP: 11.0% | MINI | 1000 | 35 | 36.08% | 360.82 |
| | | 750 | 750 | 58 | 59.79% | 448.45 |
| | | MAXI | 15000 | 4 | 4.12% | 618.56 |
| 2 | RTP: 7.0% | 900 | 900 | 15 | 18.29% | 164.63 |
| | | MINI | 1000 | 65 | 79.27% | 792.68 |
| | | 500 | 500 | 2 | 2.44% | 12.20 |
| 3 | RTP: 3.5% | 600 | 600 | 11 | 34.38% | 206.25 |
| | | 250 | 250 | 12 | 37.50% | 93.75 |
| | | 800 | 800 | 9 | 28.13% | 225.00 |
| 4 | RTP: 6.0% | MINI | 1000 | 5 | 50.00% | 500.00 |
| | | 700 | 700 | 3 | 30.00% | 210.00 |
| | | 600 | 600 | 2 | 20.00% | 120.00 |
| 5 | RTP: 9.9% | 750 | 750 | 9 | 45.00% | 337.50 |
| | | 500 | 500 | 10 | 50.00% | 250.00 |
| | | MAXI | 15000 | 1 | 5.00% | 750.00 |
| 6 | RTP: 6.5% | 250 | 250 | 6 | 18.75% | 46.88 |
| | | MINI | 1000 | 16 | 50.00% | 500.00 |
| | | 650 | 650 | 10 | 31.25% | 203.13 |

FIG. 4B

Profitable by player's skill.

| Range | |
|---|---|
| **Minimum RTP** | **Maximum RTP** |
| 3.50% | 11.02% |

In the case: 85%

| RANGE of TOTAL RTP | |
|---|---|
| **Minimum** | **Maximum** |
| 88.50% | 96.02% |

FIG. 4C

GAMING MACHINE, CONTROL METHOD FOR MACHINE, AND PROGRAM FOR GAMING MACHINE

CROSS-REFERENCE TO RELATED APPLICATION

This application is a continuation of U.S. patent application Ser. No. 17/185,702, filed Feb. 25, 2021, which is a continuation of U.S. patent application Ser. No. 15/261,551, filed Sep. 9, 2016 (now U.S. Pat. No. 10,970,958, issued Apr. 6, 2021), the disclosures of which are hereby incorporated by reference in their entirety.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The present invention relates to a gaming machine, a control method for a gaming machine, and a program for a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

Recently, some gaming jurisdictions have approved skill based games in which the player may have at least some effect on the outcome of the game. However, such skill games present additional issues with respect to retaining an aspect of unpredictably or randomness. For example, if a game allows a player to become too skilled then a winning outcome may be predictable or easily obtained.

The present invention is aimed at one or more of the problems set forth above.

SUMMARY OF INVENTION

In one aspect of the present invention, a gaming machine is provided. The gaming machine includes an operation unit, a display unit, and a control unit. The operation unit is configured to receive an operation of a player. The display unit is operably coupled to the operation unit and is configured to display a rotating selector device. The rotating selector device includes a plurality of cells arranged in a grid. The grid has a column and a plurality of rows. A reel strip is associated with the column of the grid and has a plurality of segments. Each segment has a plurality of segment symbol positions. Each segment symbol position has an associated symbol. The control unit is operably coupled to the operation unit and the display unit and is configured to initiate a game in response to player operation and to establish an outcome of the game. The control unit, in response to initiation of the game, being further configured to: display and rotate the selector device in the grid such that symbols in the reel strip are displayed in the cells of the grid; receive player input; establish a stop segment of the reel as a function of a timing associated with the player input; randomly select one of the symbol positions of the stop segment; and, establish an outcome of the game as a function of the selected one of the symbol positions of the stop segment; and, award a payout to the player as a function of the outcome of the game.

In another aspect of the invention, a control method for a gaming machine provides a game to a player. The gaming machine includes an operation unit, a display unit, and a control unit. The operation unit is configured to receive an operation of a player. The display unit is operably coupled to the operation unit and is configured to display a rotating selector device. The rotating selector device includes a plurality of cells arranged in a grid. The grid has a column and a plurality of rows. A reel strip is associated with the column of the grid and has a plurality of segments. Each segment has a plurality of segment symbol positions. Each segment symbol position has an associated symbol. The control unit is operably coupled to the operation unit and the display unit and is configured to initiate a game in response to player operation and to establish an outcome of the game. The method including the steps of: displaying and rotating the selector device in the grid such that symbols in the reel strip are displayed in the cells of the grid; receiving player input; establishing a stop segment of the reel as a function of a timing associated with the player input; randomly selecting one of the symbol positions of the stop segment; and, establishing an outcome of the game as a function of the selected one of the symbol positions of the stop segment; and, awarding a payout to the player as a function of the outcome of the game.

In still another aspect of the present invention, a program for a gaming machine provides a game to a player. The gaming machine includes an operation unit, a display unit, and a control unit. The operation unit is configured to receive an operation of a player. The display unit is operably coupled to the operation unit and is configured to display a rotating selector device. The rotating selector device includes a plurality of cells arranged in a grid. The grid has a column and a plurality of rows. A reel strip is associated with the column of the grid and has a plurality of segments. Each segment has a plurality of segment symbol positions. Each segment symbol position has an associated symbol. The control unit is operably coupled to the operation unit and the display unit and is configured to initiate a game in response to player operation and to establish an outcome of the game. The program of the gaming machine performing the steps of: displaying and rotating the selector device in the grid such that symbols in the reel strip are displayed in the cells of the grid; receiving player input; establishing a stop segment of the reel as a function of a timing associated with the player input; randomly selecting one of the symbol positions of the stop segment; and, establishing an outcome of the game as a function of the selected one of the symbol positions of the stop segment; and, awarding a payout to the player as a function of the outcome of the game.

BRIEF DESCRIPTION OF DRAWINGS

FIG. 4B is a chart showing exemplary return to player percentages for a sample set of segments, according to an embodiment of the present invention.

FIG. 4C is a chart illustrating a range of return to player percentages based on player skill ranges.

DETAILED DESCRIPTION OF EMBODIMENTS

A gaming machine, according to an embodiment of the present invention, referencing the attached figures is described in detail below. Further, duplicated descriptions will be omitted for identical attached symbols in identical or corresponding parts in each figure.

With reference to the drawings, and in operation, the present invention is directed towards a gaming machine, a control method for a gaming machine, and a program for a gaming machine that provides a game to a player. In one embodiment, the game includes a primary game and a feature game. As will be discussed in further detail below, the primary and/or bonus game, provides a game with a skill aspect ("skill based game"). In other words, the player may affect the outcome of the game. In one aspect of the present invention, the primary or bonus game includes a rotating selector device. The rotating selector device is spun during the game and is stopped in response to player input. While the rotating selector device, the player can attempt to time the stopping of the rotating selector device in order to achieve a desirable outcome.

In some embodiments of the present invention, a skill-based game utilizing the rotating selector device is provided as a stand-alone or primary game. In other embodiments of the present invention, a skill-based game utilizing the rotating selector device is provided as a bonus game to a primary or bonus game. The primary game may be a video slot game (as discussed in more detail below). Alternatively, the primary game may be video poker, video black jack, bingo, keno, a wheel game or the like. During the primary game, if a trigger condition occurs, a bonus game in the form of a skilled based game using the rotating selector device may be provided.

The trigger condition may be any suitable trigger condition. For example, trigger condition may be randomly determined (and unknown) to the player, i.e., a mystery trigger. In other embodiments, the trigger condition may be the appearance or occurrence of one or a plurality of predetermined symbols during the main or primary game. Alternatively, the trigger condition may be received from an external source, such as a player tracking system and/or casino management system (see below).

Figure 1A:
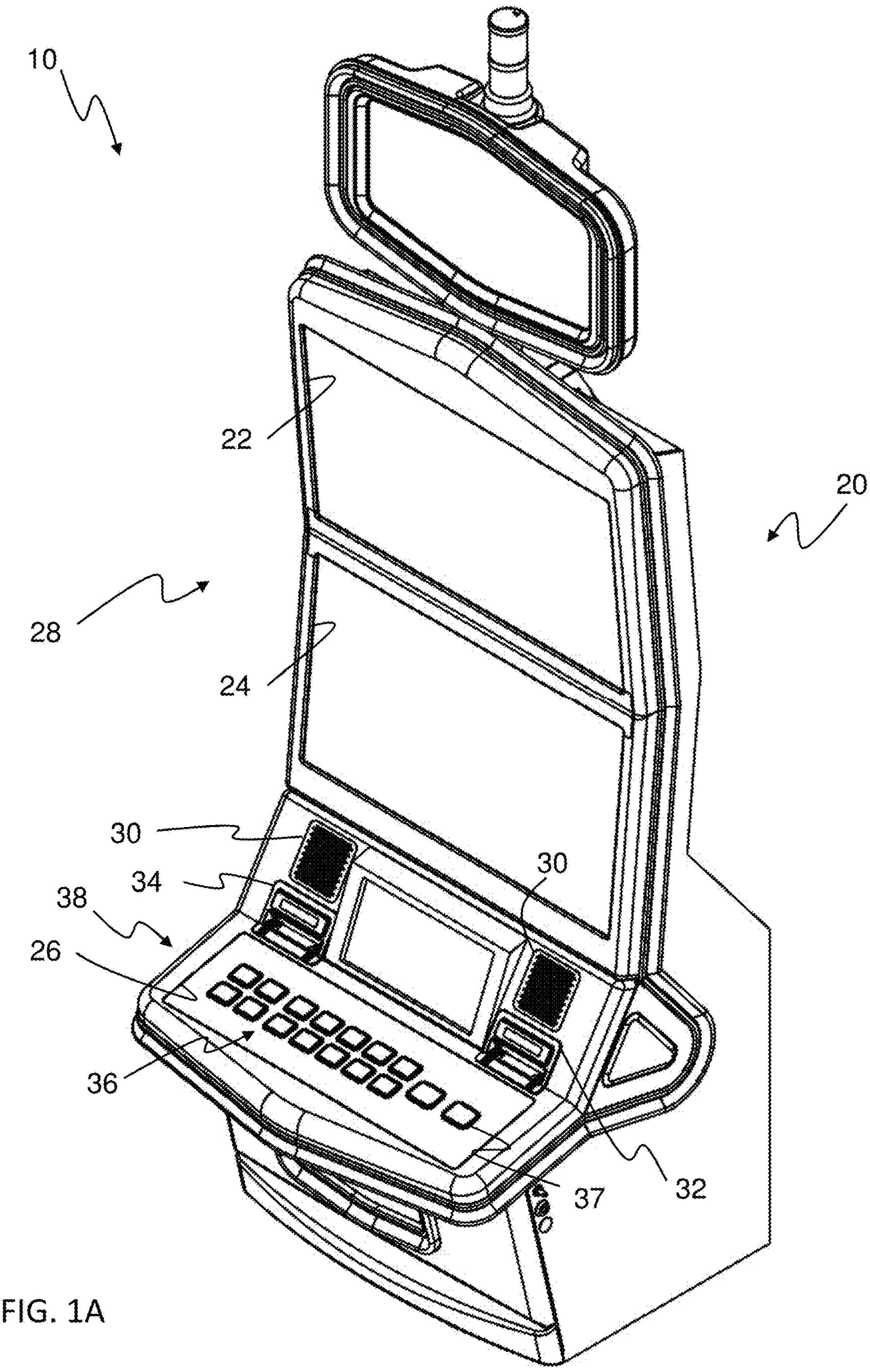
FIG. 1A is a perspective view of the gaming machine, according to the first embodiment.
Figure 1B:
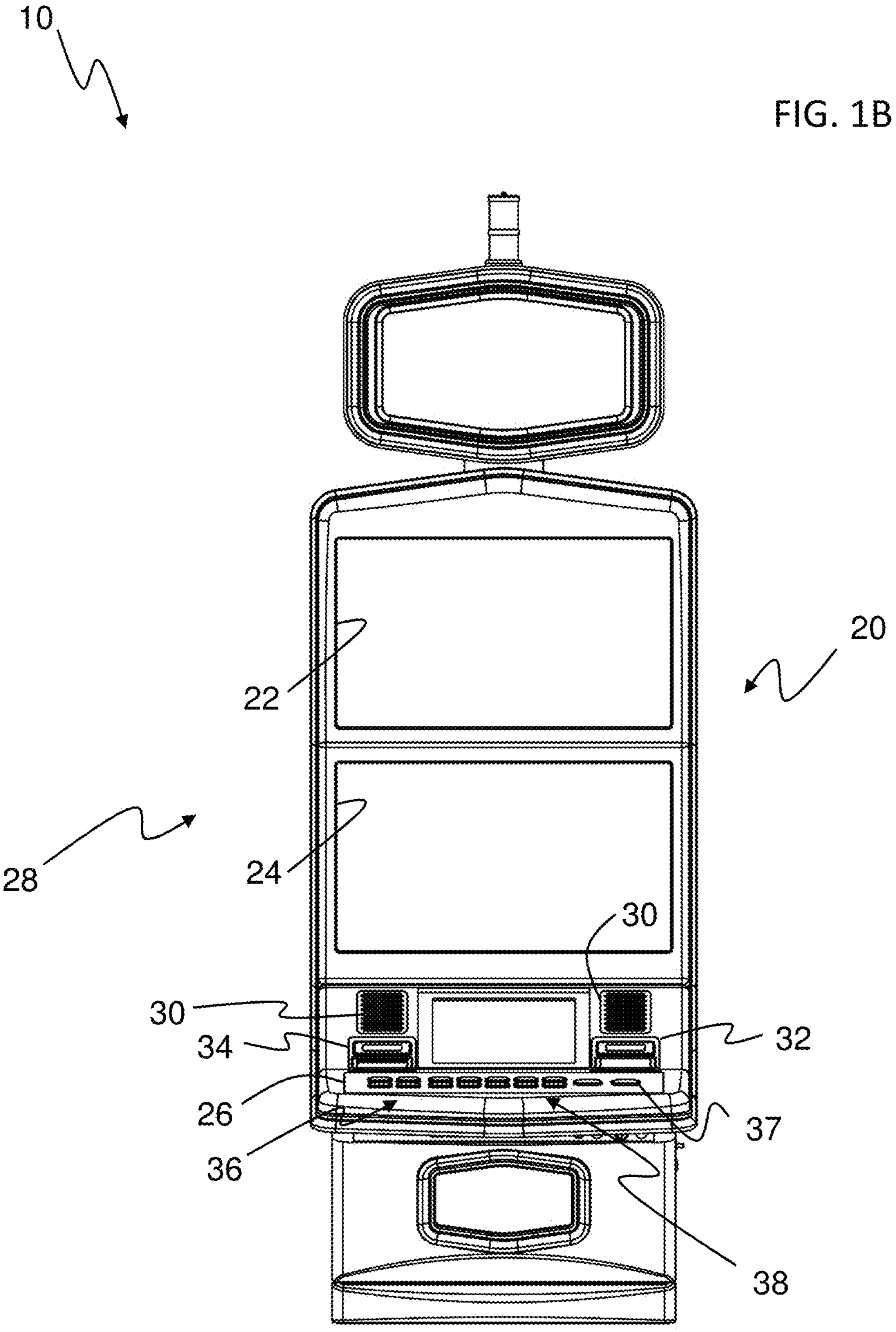
FIG. 1B is a front view of the gaming machine of FIG. 1A.

The gaming machine according to the present embodiment, receives a predetermined game value from the player, generates a game result, and provides a payout to the player according to the game result. FIG. 1A and FIG. 1B are a perspective view and a front view, respectively, of a gaming machine 10, according to the present embodiment. As shown in FIG. 1, this gaming machine 10 provides a cabinet 20 providing an upper display 22, a lower display 24, a control panel 26 and may also house a player tracking or ranking unit 57 (see FIG. 2). The upper and lower displays 22, 24 form a display unit 28. The cabinet 20 also houses a control unit 50 (see FIG. 2) that controls each part (see below). The control unit 50 also implements a random number generator (RNG) that is used during operation of the game. Each configuration is described below.

The upper display 22 and the lower display 24 may be flat panel display devices, such as both liquid crystal display devices and organic EL display devices and the like, and by controlling via each control unit 50, the game screen mentioned below functions as the display unit 28 provided to the player.

Speakers 30 are provided on the left and right of the cabinet 20, and by controlling via the control unit 50, sound is provided to the player. On the control panel 26, a bill/ticket identification unit 32, the printer unit 34, and an operation unit 36 are provided.

The player tracking unit 57 may be housed on the center of the front surface of the cabinet 20. The player tracking unit 57 has a card reader that recognizes a player identification card, a display that presents data to the player, and a keypad that receives input by the player. This type of player tracking unit 57 reads information recorded on the player identification card inserted by the player into the card reader, and displays the information and/or information acquired by communicating with the external system on the display, by cooperatively operating with the control unit 50 mentioned below or an external system. Further, input from the player is received by the keypad, the display of the display is changed according to the input, and communication with the external system is carried out as necessary.

The bill/ticket identification unit 32 is disposed on the control panel 26 in a state where the insertion opening that a bill or ticket is inserted into is exposed, an identification part that identifies a bill/ticket by various sensors on the inside of the insertion opening is provided, and a bill/ticket storage part is provided on the outgoing side of the identification part. The bill/ticket identification unit 32, receives and identifies bills and tickets (including vouchers and coupons) that are the game value as a game executing value, and notifies the control unit 50 mentioned below.

The printer unit 34 is disposed on the control panel 26 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer unit 34, under the control of the control unit 50 mentioned below, prints information on paper and outputs a ticket according to credit payout processing from the gaming machine 10. The output ticket can use the payout credit as game play by being inserted into the bill/ticket identification unit 32 of another gaming machine, or, can be exchanged for cash by a kiosk terminal inside of the casino or a casino cage.

The operation unit 36 receives the operation of the player. The operation unit 36 includes a group of buttons 38 that receives various instructions from the player on the gaming machine 10. The operation unit 36, for example, may include a spin button 37 and a group of setting buttons 38. The spin button 37 receives an instruction to start (start rotating the reel) the game listed below. In certain embodiments discussed below, the spin button 37 may be used as a stop button 37 during the skill-based game. Alternatively, or in addition, the display unit 28 may be provided with a touchscreen interface. The stop button 37 may be implemented by the touchscreen interface on the display unit 28 with corresponding GUI component such as graphical image of a stop button for example. The group of setting buttons 38 includes a group of bet buttons, a group of line-designation buttons, a max bet button, and a payout button and the like. The group of bet buttons receives an instruction operation regarding the bet amount of credits (bet number) from the player. The group of line-designation buttons receive an instruction operation that designate a pay line (referred to as an effective line below) subjected to a line judgment below from the player. The max bet button receives an instruction operation regarding the bet of the maximum amount of credits that can be bet at one time from the player. The payout button receives an instruction operation instructing a credit payout accumulated in the gaming machine 10.

Figure 2:
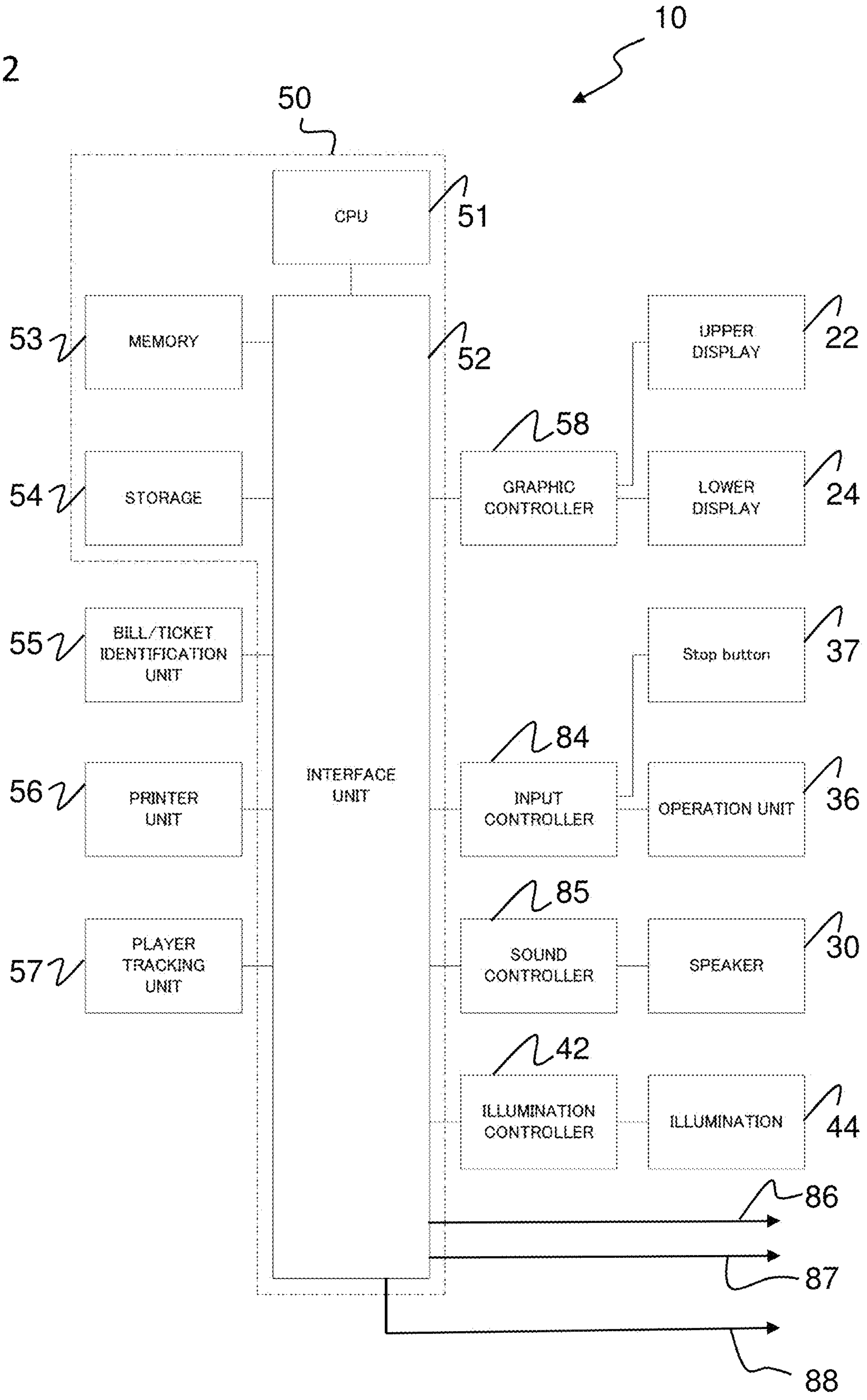
FIG. 2 is a functional block diagram of the gaming machine in FIG. 1.

With reference to FIG. 2, further on the inside of the cabinet 20, a control board equipped with a central processing unit 51 (abbreviated as CPU below) that configures the control unit 50, an interface unit (or part) 52, a memory 53 and a storage 54 and the like are incorporated. The control board is configured so that communication is possible through the interface unit 52 and each of the components equipped on the cabinet 20, controls the operation of each part by executing the program recorded in the memory 53 or the storage 54 of the CPU 51, and provides a game to the player.

FIG. 2 shows a functional block diagram of the gaming machine 10, according to the present embodiment. The gaming machine 10 provides the control unit 50. The control unit 50 is configured as the interface unit 52 including a chip set providing communication functions of the CPU 51, a memory bus connected to a CPU, various expanding buses, serial interfaces, USB interfaces, Ethernet (registered trademark) interfaces and the like, and a computer unit where the CPU 51 provides the addressable memory 53 and the storage 54 through the interface unit 52. The memory 53 can be configured to include RAM that is a volatile storage medium, ROM that is a nonvolatile storage medium, and EEPROM that is a rewritable nonvolatile storage medium. The storage 54 provides the control unit 50 as an external storage device function, can use reading devices such as a memory card that is a removable storage medium, and a magneto optical disk and the like, and can use hard disks.

On the interface unit 52, in addition to the CPU 51, the memory 53, and the storage 54, a bill/ticket identification unit 55, a printer unit 56, the player tracking unit 57, a graphic controller 58, an input controller 84, and a sound controller 85 are connected. That is, the control unit 50 is connected to the operation unit 36 through the input controller 84, and connected to the upper display 22 and/or the lower display 24 through the graphic controller 58. Further, when illumination that provides decorative lighting to the gaming machine 10 is provided, the illumination is controlled under the control of the control unit 50 on the interface unit 52, and an illumination controller that provides a decorative lighting effect may be connected.

The control unit 50, which includes memory 53 and storage 54, controls each part by executing a program stored in the memory 53 and the storage 54, and provides a game to the player. Here, for example, the memory 53 and storage 54 may be configured to store a program and data of an operating system and subsystem that provide the basic functions of the control unit 50 to the EEPROM of the memory 53, and stores a program and data of an application that provides a game to the storage 54. According to such a configuration, it can be easy to change or update a game by replacing the storage 54. Further, the control unit 50 may be a multiprocessor configuration that has a plurality of CPUs.

Each block connected to the control unit 50 is described below. The bill/ticket identification unit 55 corresponds to the bill/ticket identification unit 32, receives bills or tickets in the insertion opening, and notifies the control unit 50 of identifying information corresponding to the assortment of bills or the payout processing of credits. The bill/ticket identification unit 55 notifies the information to the control unit 50, and the control unit 50 increases the usable credit amount inside of the game according to the notified content. The printer unit 56 corresponds to the printer unit 34, and under the control of the control unit 50 that receives an operation of the payout button of the group of setting buttons 38, information corresponding to the credit payout processing from the gaming machine 10 is printed and output on a printed ticket.

The player ranking (or tracking unit) unit 57 cooperatively operates with the control unit 50, and sends and receives information and the like of the player from the casino management system. The graphic controller 58 controls the upper display 22 and the lower display 24, under the control of the control unit 50, and displays a display image that includes various graphic data. The sound controller 85 drives the speakers 30 under the control of the control unit 50, and provides various sounds such as an announcement, sound effects, BGM and the like.

Further, the interface unit 52, has various communication interfaces for communicating with the exterior of the gaming machine 10, for example the interface unit 52 can communicate with an external network by Ethernet 86, 87, and a serial output 88. In the present embodiment, one example shows when there is communication between a well-known server side gaming network (Server Based Gaming of FIG. 2), a G2S network (Game to System of FIG. 2), and a slot information system (Slot Data System of FIG. 2), respectively.

In the illustrated embodiment discussed below, the skilled based component or game is disclosed as a bonus game which may be triggered during play of a primary game. However, it should be noted that the present invention is not limited to such. The skill based component or game may be provided as a main or primary game or a stand-alone game.

Further, in the illustrated embodiment discussed below, the primary game is a video slot game. However, as noted above the present invention is not limited to such a primary game.

Figure 5A:
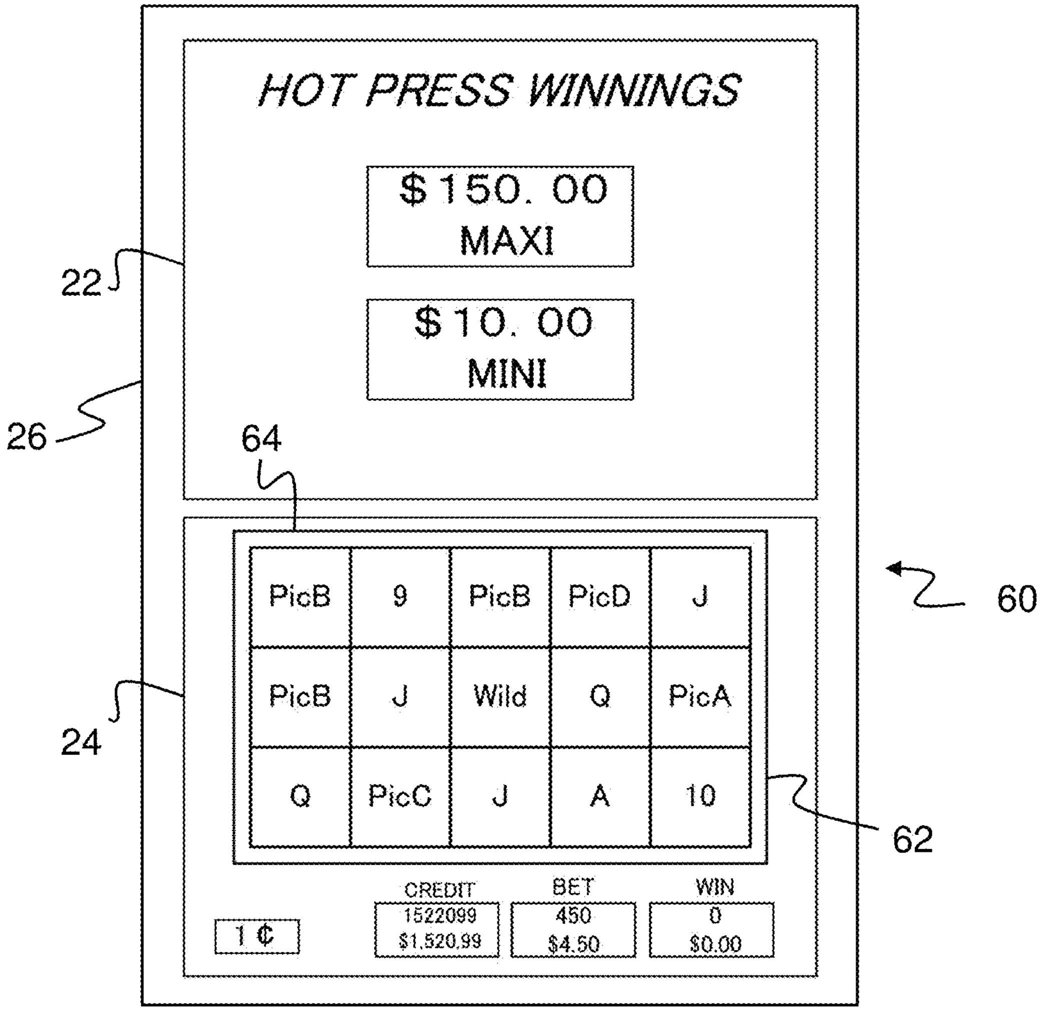
FIG. 5A is a first diagrammatic illustration of a display area of the gaming machine in FIG. 1, according to a second embodiment of the present invention.
Figure 5B:
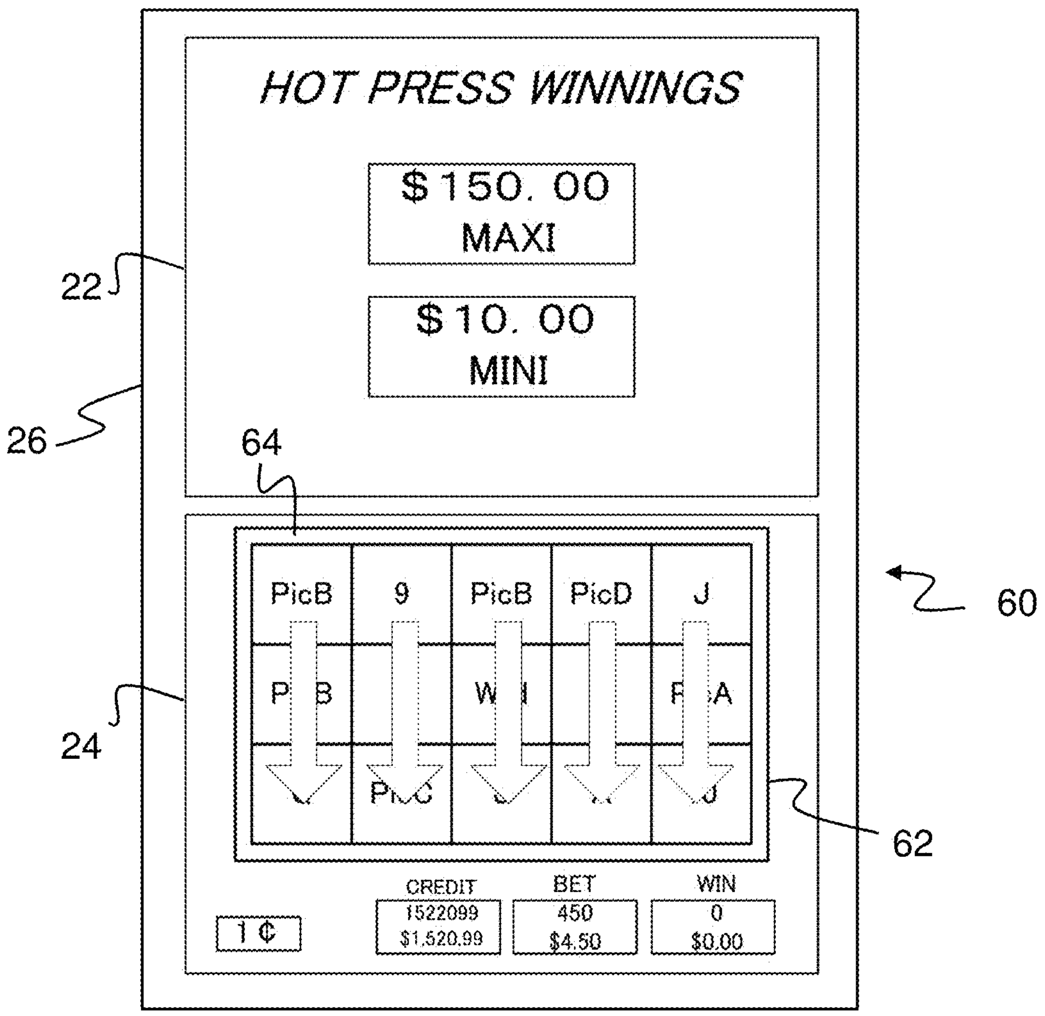
FIG. 5B is a second diagrammatic illustration of the display area of the gaming machine of FIG. 5A.
Figure 5C:
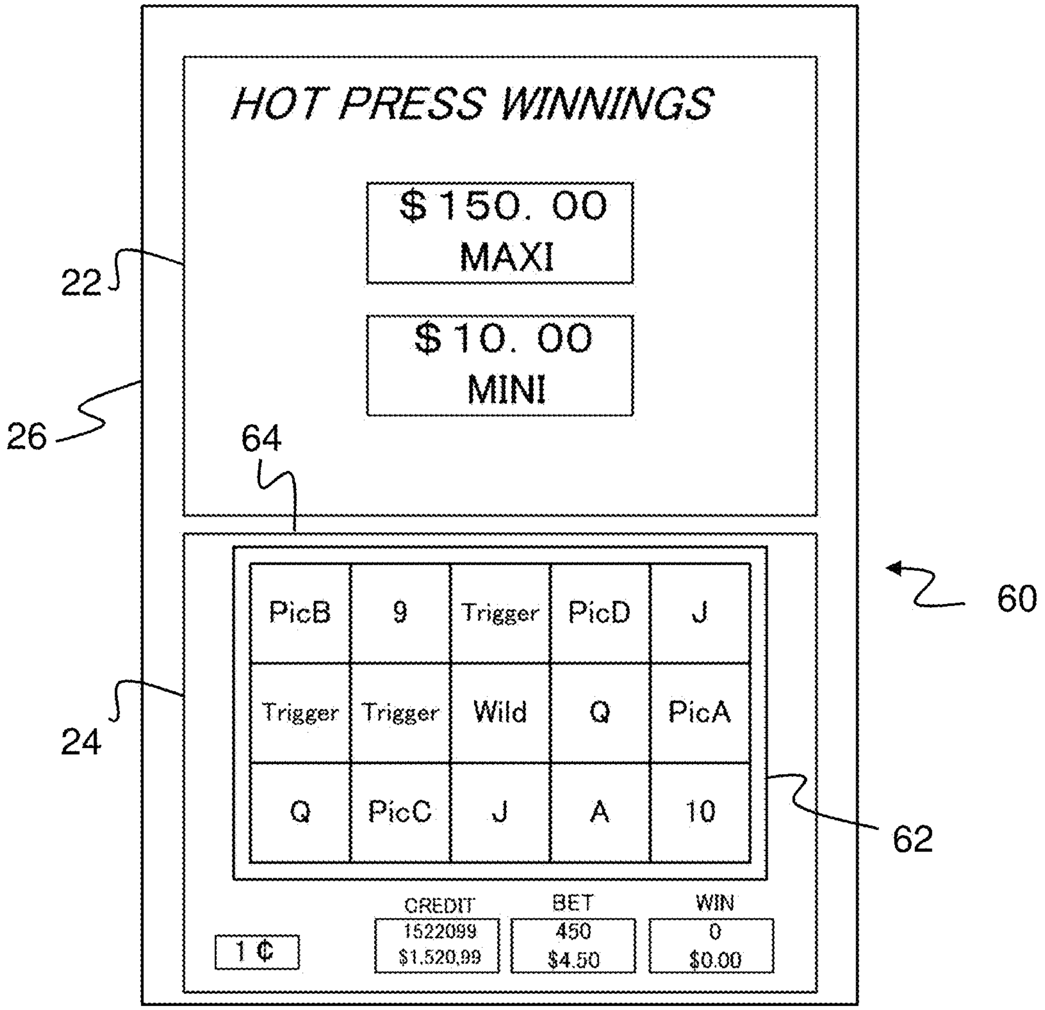
FIG. 5C is a third diagrammatic illustration of the display area of the gaming machine of FIG. 5A.

With reference to FIGS. 5A, 5B and 5C a game screen 60 provided by the gaming machine 10 during a primary game, according to an embodiment of the present invention. The game screen 60 may be displayed on the display unit 28 (the upper display 22 and/or the lower display 24) by the control unit 50 executing a predetermined program. In the illustrated embodiment, the game screen is displayed on the lower display 24. In the upper display 22, a game title, e.g., "Hot Press Winnings" may be displayed as well as other information related to the primary game and/or the bonus game. For instance, in the illustrated embodiment the bonus game may provide to the player a first jackpot ("Maxi") and a second jackpot ("Mini"). As shown, the value of the jackpots may be displayed on the upper display 22 during the primary game.

In one aspect of the present invention, the gaming machine 10 provides a game to the player. The game may include a primary game and a bonus or feature game. For instance, the primary game may be a video slot game, and the bonus game may be the awarding of a number of free games or spins in response to the occurrence of a trigger condition, e.g., during the primary game. During the primary game, in response to a predetermined trigger or trigger condition, the skill based bonus game may be provided.

Figure 3A:
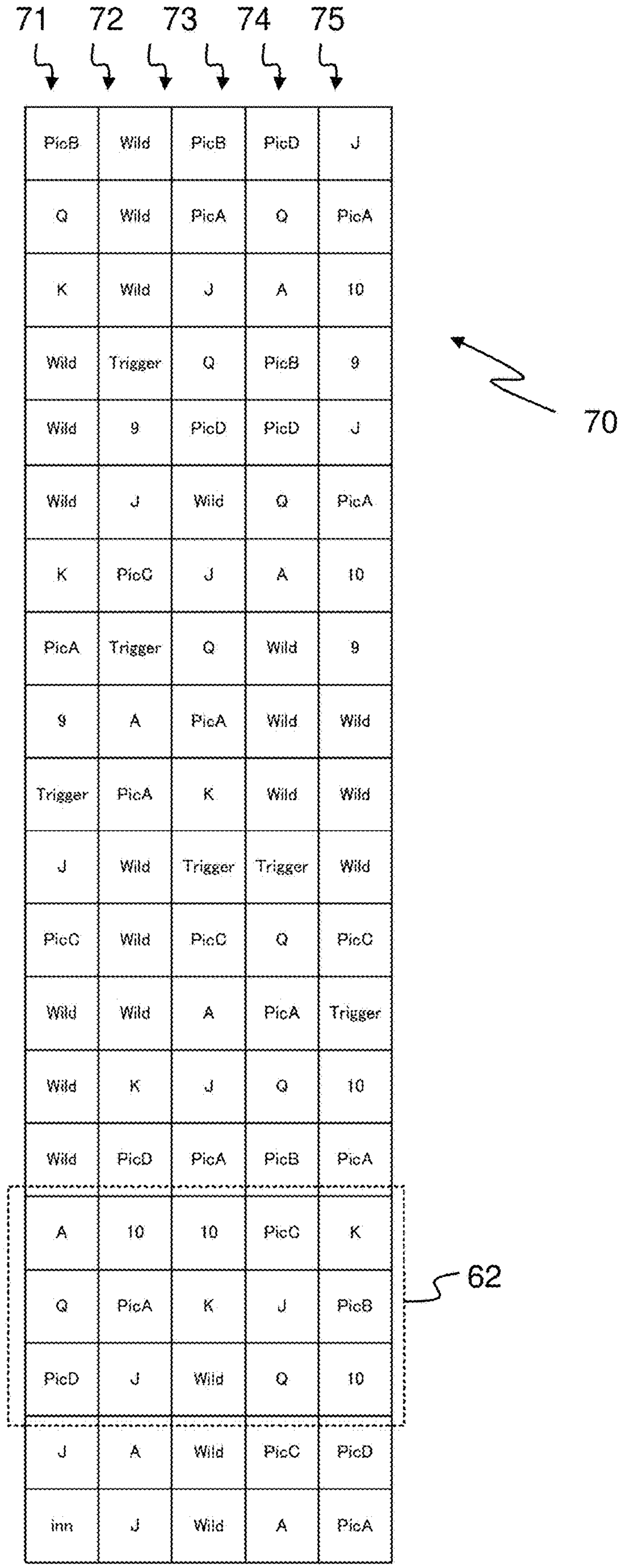
FIG. 3A is a figure showing an exemplary symbol arrangement showing the order of symbols displayed during a base or primary game, according to an embodiment of the present invention.

The primary game of the present invention utilizes a determination or display area or grid 62 during the game. The present embodiment shows the state of displaying the game screen on the lower display 24. As shown in FIG. 3A, this game screen has a determination area 60 for displaying symbols. By using such a game screen, the gaming machine 10 of the present embodiment operates as a slot machine that pays a payout according to a winning combination of symbols displayed on the determination area 60.

The display unit 28 displays a plurality of symbols in the display area 62. The determination area 60, or grid 60 has a plurality of rows (r) and columns (c). The display area 62 is configured by a plurality of cells 64 that are the stop position of symbols.

In the embodiment shown in FIGS. 5A-5C, the display area 62 includes 15 cells 64 disposed in a grid shape of three rows and five columns. In the illustrated embodiment, the determination area or grid 60 is displayed on the lower display 24. The upper display 22 may be used to display animations during the feature animations. Further, the display unit 28 can display a decorative area, and an area that displays credit amount, bet number, and a credit amount obtained by winning (WIN number) and the like, outside of the determination area 60. On each of the plurality of cells 64 of the display area 62, one symbol is stopped and displayed.

On each cell 64 of the display area 62, as shown in FIGS. 3A and 4B, a symbol is displayed based on the symbol arrangement of virtual reel strips 71 to 75 configured of a virtual reel set 70. That is, the cells 64 of the display area 62 correspond to the virtual reel strips 71 to 75 by column, and the symbols disposed on predetermined parts of each virtual reel strip 71 to 75 are displayed. Furthermore, as mentioned below, by moving (scrolling or spinning) each symbol by column based on the symbol arrangement of the virtual reel strips 71 to 75, the symbols displayed in the cells 64 of the determination area 60 change, and by stopping the movement (scrolling or spinning) by columns, the symbols are stopped. Here, the virtual reel strips 71 to 75 are data where the control unit 50 uses a program having the memory 53 or the storage 54, and data showing the symbol arrangement (i.e., the order of symbols on each reel) regulated by each cell column. Further, the virtual reel set 70 is a general term for such virtual reel strips 71 to 75.

Each virtual reel strip 71 to 75, in the example of FIG. 3A, is configured by 20 symbols in respective symbol positions, and those symbols are aligned in an order defined by each reel. Each virtual reel strip 71 to 75 includes symbols selected from a symbol set. This symbol set includes card symbols ("9", "10", "J", "Q", "K", and "A") that imitate playing cards as regular symbols, and picture symbols ("PicA", "PicB", "PicC", and "PicD") that show a pattern. Further, this symbol set includes a wild symbol ("Wild") that is substituted as another symbol when a win is determined and a trigger symbol ("Trig") that may be used to determine if a the bonus game is to be played (see below). Each of these symbols have a different rank from each other regarding their value when winning, their rank gradually raises in this order: "9", "10", "J", "Q", "K", "A", "PicA", "PicB", "PicC", and "PicD", A combination of symbols that includes high-ranking symbols when winning, can obtain a larger winning payout compared to a combination of low-ranking symbols when winning.

In general, the control unit 50 starts a primary game, determines the stop position of each virtual reel strip 71 to 75 randomly, the virtual reel strips 71 to 75 move from a current position, and the operation to stop on a stop position uses the display unit 28 (for example, the lower display 24) and is expressed. Due to this, in the display area 62 or determination area 60, the symbols included on the virtual reel strips 71 to 75 are continuously moved (scrolled or spun) in the vertical direction of the display area 62 (see FIG. 5B), and one symbol of one cell 64 aligned in an order of the symbol based on the symbol arrangement is stopped so that it is displayed (see FIG. 5C)

The control unit 50 changes and stops the plurality of symbols displayed on the display unit 28 according to the operation of the player received by the operation unit 36, and a payout may be paid according to the stopped symbols inside the determination area 60.

In the display area 62, a pay line is set that is used when winning is determined. The pay line is set to be extended over the column on the right end from the cells of the column of the left end, and is a line that combines the plurality of cells 64 determining a win. The number of effective lines within the set pay line is selected by the operation of a group of line designation buttons included in the group of setting buttons 38 of the operation unit 36 for the player. The control unit 50, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines (LINE 1-40) of cells with three rows and five columns in the display area 62 is set (see FIG. 3B). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line.

Figure 3B:
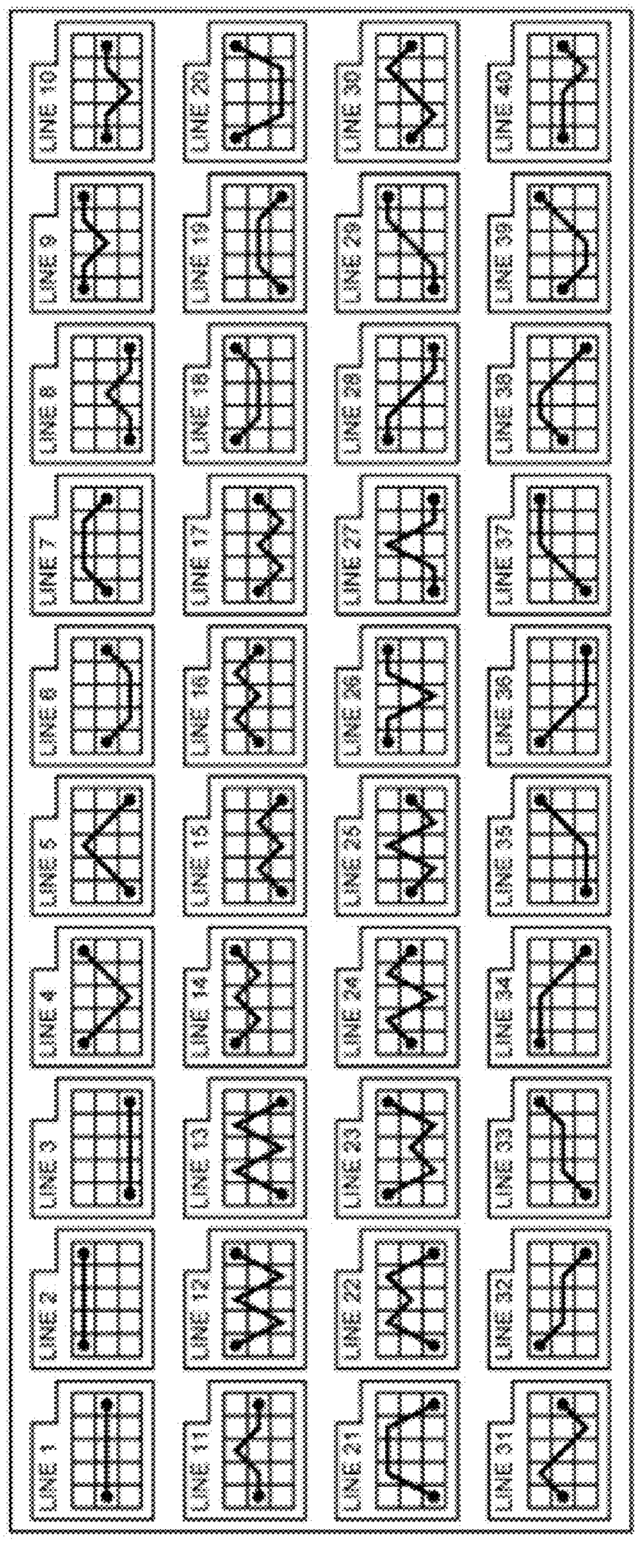
FIG. 3B is a figure showing one example of a pay line set on the determination area in FIG. 3A.

It should be noted that pay lines shown other than (or in addition to) the pay lines shown in FIG. 3B may be used. In general, the pay lines shown in FIG. 3B start in the first column and end in the last column, and include one cell per column. However, one or more pay lines could include one or more cells in the same column and may include a vertical pay line.

In one embodiment of the present invention, the gaming machine 10 includes the operation unit 36, a display unit 22, 24 and a control unit 50. The operation unit 36 is configured to receive an operation of a player (see above). The display unit 22, 24 is operably coupled to the operation unit 36 and is configured to display a symbol display area 62. The symbol display area 62 includes a plurality of cells 64 arranged in a grid 60. As discussed above, the grid 60 has a plurality of rows and a plurality of columns.

The control unit 50 is operably coupled to the operation unit 36 and the display unit 22, 24 and is configured to initiate a game in response to player operation and to establish an outcome of the game. The control unit 50, in response to initiation of the game, being randomly selects a plurality of symbols associated with the symbol display area or grid 60. Each symbol in the plurality of symbols is associated with one of the plurality of cells 64 in the grid 60. The plurality of symbols forms an interim outcome.

In some embodiments, each symbol in the interim outcome may be randomly selected. In the illustrated embodiment, the game is a video slot game. As discussed above, each column has an associated reel strip. In randomly selecting the symbols in the interim outcome, the control unit 50 randomly determines a stop position (using a random number generator or RNG) for each reel strip and displays the interim outcome in a manner to simulate rotating reels. The symbols in each column in interim outcome is a function of the associated reel strip and the randomly determined stop position.

The control unit 50 determines if a trigger condition has occurred during the primary game, and if the trigger condition has occurred, the control unit 50 provides the skill based bonus game.

In one embodiment the trigger condition is the appearance a predetermined symbol or symbols in the interim outcome. The predetermined symbol may be randomly determined (and unknown) to the player, i.e., a mystery trigger.

It should be noted that the trigger condition may be any suitable condition or set of conditions that may occur in the game, or occur independent of the game, e.g., from an outside source such as a player tracking system. The trigger condition may be a mystery trigger event, i.e., an event which while related to the main game, is not visible or part of or shown within the outcome of the game.

Figure 4A:
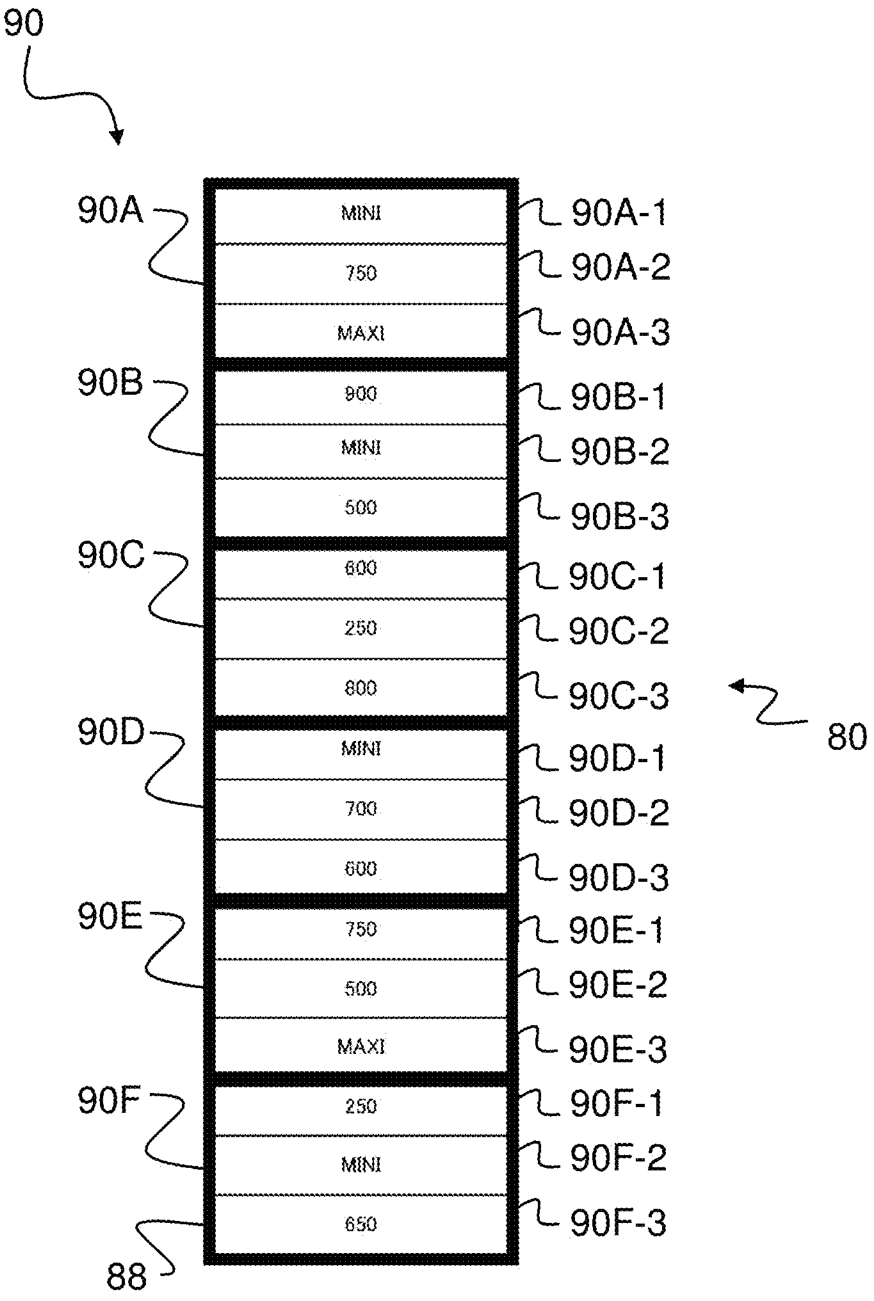
FIG. 4A is an exemplary segment reel strip, according to an embodiment of the present invention.
Figure 5D:
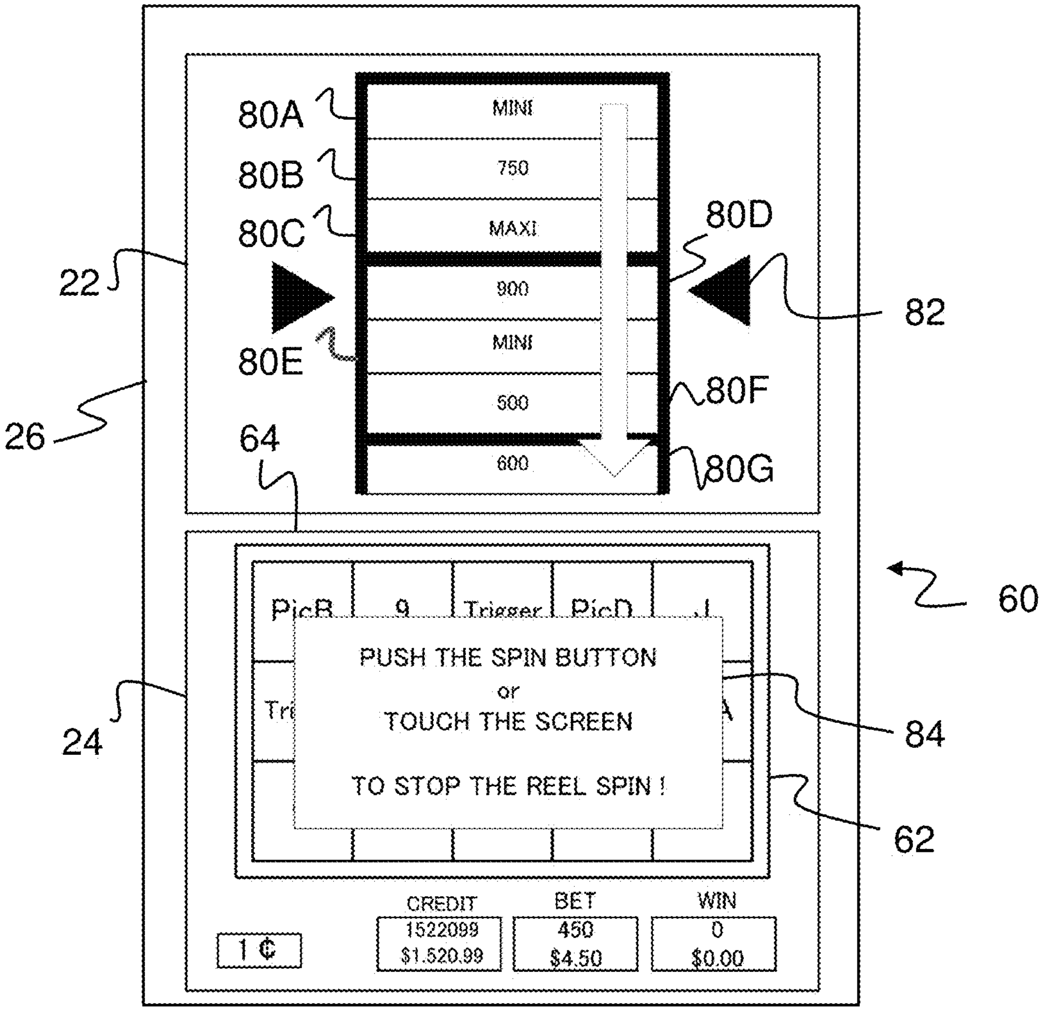
FIG. 5D is a fourth diagrammatic illustration of the display area of the gaming machine of FIG. 5A.
Figure 5E:
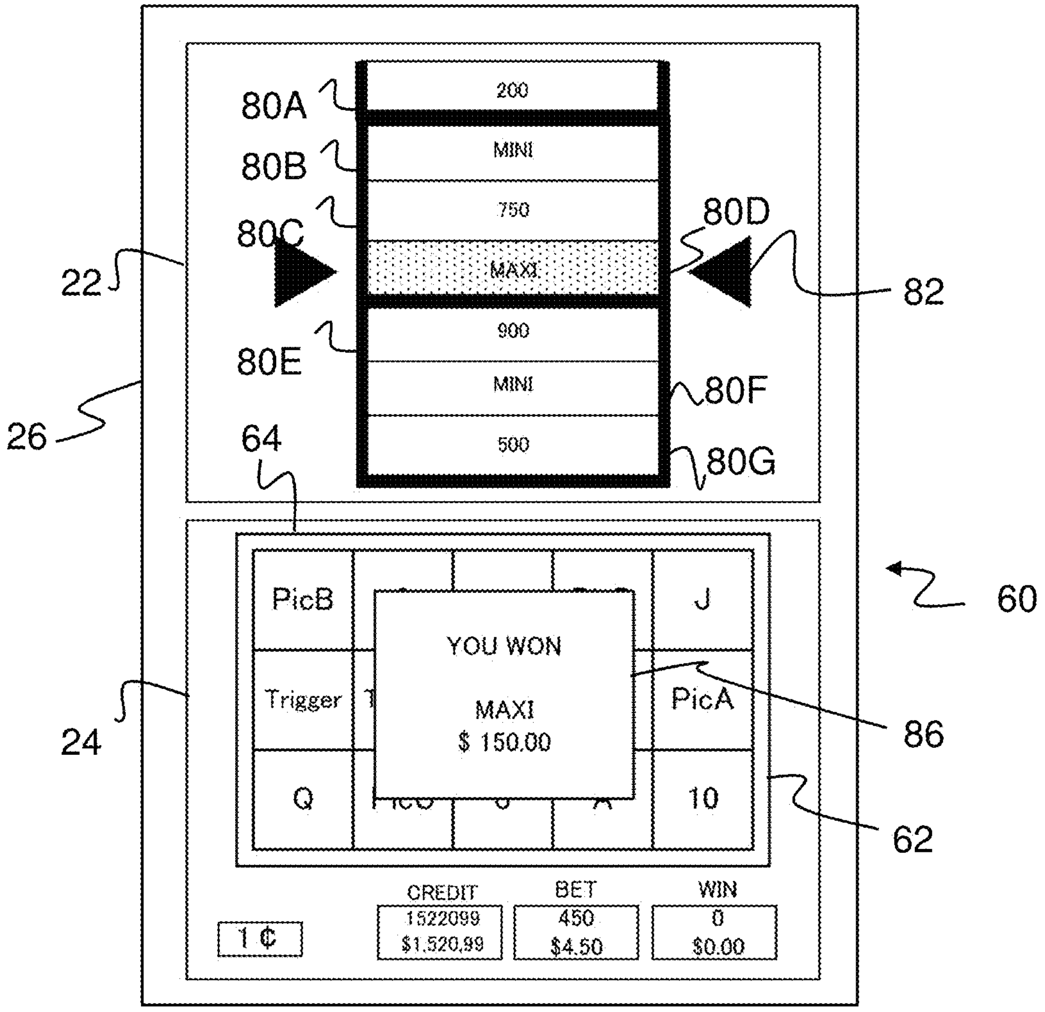
FIG. 5E is a fifth diagrammatic illustration of the display area of the gaming machine of FIG. 5A.

With reference to FIGS. 4A, 5D and 5E, a skill based game according to the present invention is shown. In the illustrated embodiment the skill based game is descried as a bonus game triggered in response to the occurrence of the trigger condition in the primary or bonus game.

In the illustrated embodiment, when the skill based game is initiated, a rotating selector device 80 is displayed on the display unit 28. The rotating selector device 80 includes a plurality of symbols or indicia. The indicia may be game symbols, credit values, and/or jackpot symbols. In the illustrated embodiment, the symbols include credit values, a MINI jackpot symbol and a MAXI jackpot symbol.

In one embodiment, each of the jackpots represented by the jackpots symbols have a set value, e.g., $10.00 and $150.00, respectively. In another embodiment the jackpots are progressive jackpots that may be either based on contributions from the gaming machine 10 and/or based on contributions from a plurality of linked gaming machines (not shown).

As shown in FIG. 5D, in one embodiment of the present invention, during the skill based game the rotating selector device 80 rotates in a horizontal direction and includes a pointer 82. While the rotating selector device 80 is rotating, an in instructional message instructing the player to actuate the "Spin" or "Stop" button 37 or the screen in order to stop the rotating selector device 80. In response to the player actuating the Spin/Stop button 37 or touching the screen, the rotating selector device 80 stops rotating. As shown in FIG. 5E, the pointer 82 indicates one of the symbols or indicia on the rotating selector device 80 and the corresponding award is awarded to the player. The player may be informed of the award and/or amount of the award via an information dialog 86.

With specific reference to FIGS. 4A and 5A-5E, in the illustrated embodiment the rotating selector device 80 includes a plurality of cells 80A-80G arranged in a grid having a single column and a plurality of rows. With specific reference to FIG. 4A, a reel strip 88 is associated with the column. The reel strip 88 has a plurality of segments 90. In the illustrated embodiment, the reel strip 90 has six segments 90A-90F. Each segment 90A-90F has a plurality of segment symbol positions. 90A-1, 90A-2, 90A-3, 90B-1, 90B-2, 90B-3, 90C-1, 90C-2, 90C-3, 90D-1, 90D-2, 90D-3, 90E-1, 90E-2, 90E-3, 90F-1, 90F-2, 90F-3. Each segment symbol position has an associated symbol or indicia.

In the illustrated embodiment, each segment 90A, 90B, 90C, 90D, 90E, 90F has three symbol positions. Thus, reel strip 88 includes 18 symbol positions 90A-1, 90A-2, 90A-3, 90B-1, 90B-2, 90B-3, 90C-1, 90C-2, 90C-3, 90D-1, 90D-2, 90D-3, 90E-1, 90E-2, 90E-3, 90F-1, 90F-2, 90F-3.

In use, the player is able to view the symbols or indicia on the reel strip 88 as the reel strip 88 is rotated along the grid/column and attempt to time actuating the Spin/Stop button 37 in order to achieve a desired outcome. However, in order to introduce unpredictably into the outcome, the control unit 50 determines an outcome of the skill based game as a function of a timing of the player's input (actuation of the Spin/Stop button 37) and a random number.

First, the control unit 50, after initiation of the skill based game, display and rotate the selector device 88 in the grid such that symbols in the reel strip are displayed in the cells of the grid. After receipt of the player input, the control unit 50 establishes a stop segment by selecting one of the segments 90A-90F based on the timing of the player input. The stop segment may be established, e.g., based on a rotational speed of the rotating selector device 88, the timing of the player input and a predetermined constant.

Once the stop segment is established, the control unit 50 may randomly select one of the symbol positions of the stop segment and establishes an outcome of the skill based game as a function of the selected one of the symbol positions of the stop segment. In the illustrated embodiment shown in FIG. 5E, the control unit 50 has selected the first segment 90A as the stop segment and the last segment symbol position 90B-3 of the first segment 90A as the outcome of the skill based game. The reel strip 88 is then stopped such that the selected symbol position is adjacent to the pointers 82. As shown, in the illustrated embodiment the outcome of the skill based game is the MAXI jackpot award which is then awarded to the player.

In one embodiment, each of the segment symbol positions of the stop segment has an equal probability. In another embodiment the probabilities may be weighted such that the segment symbol positions have a different probability of being selected.

With reference to FIG. 4B, a chart showing an exemplary math model of the present invention. For each segment, the estimated return to player or RTP is provided. In one aspect of the present invention, each segment has a predetermined RTP as shown in the exemplary chart of FIG. 4B. Thus, the theoretical RTP for the bonus game may be based on a player's skill. In other words, the player, through skill, may affect which segment is established or chosen as the stop segment. However, the actual award to be awarded to the player is a function of the symbol in the randomly selected segment symbol position. For each segment symbol position, the associated symbol or indicia is shown along with the associated prize or award. As shown, each segment symbol position may have a weight, resulting in a probably or chance of being randomly selected. Based on the exemplary chart of FIG. 4B, the overall return to player for the skill based game is shown in FIG. 4C.

In another aspect of the present invention, the control unit 50 is operably configured to periodically modify an aspect of the (segment) reel strip 88 or reel spin to affect the predictably of the outcome of the skill based game. In other words, the control unit 50 provides the ability to predict the outcome of the game. The control unit 50 may modify the aspect of the segment reel strip every x each play of the skill based game, where x is constant, e.g., 1, or random. Moreover, the control unit 50 may modify the aspect of the reel strip or reel spin during single play of the skill based game.

Figure 7A:
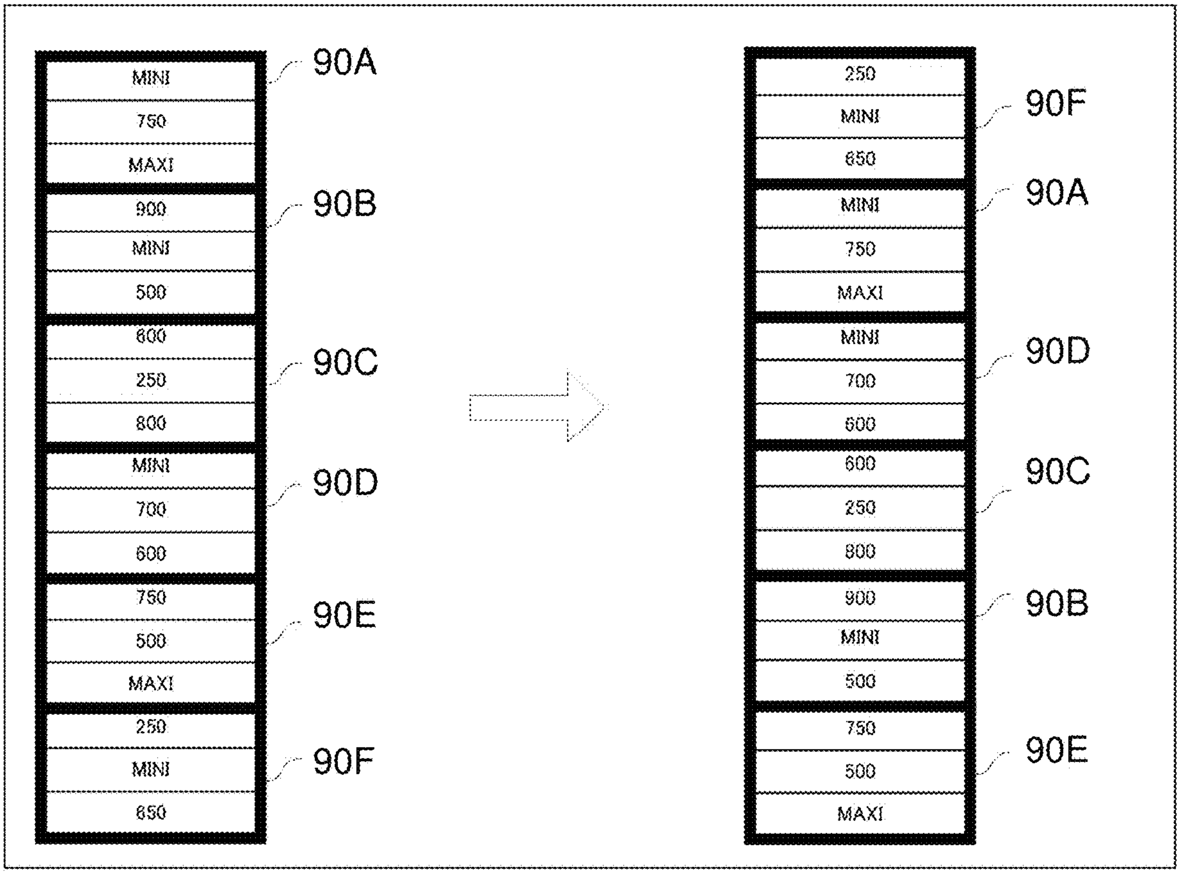
FIG. 7A is a diagrammatic illustration of a modification to a bonus reel strip, according to a first embodiment of the present invention.

For example, the modified aspect of the reel strip 88 is the speed at which the rotating selector device, i.e., reel strip 88 is rotated. In another embodiment of the present invention, the modified aspect of the segment reel strip 88 is the order of the segments in the segment reel strip 88. With specific reference to FIG. 7A, the order of the segments 90A-90F may be modified randomly or in predetermined patterns. In the segment reel strip 88 on the left in FIG. 7A, the segments are in the following order 90A, 90B, 90C, 90D, 90E, 90F. In the segment reel strip 88 on the right, the order of the segments has been modified: 90F, 90A, 90D, 90C, 90B, 90E.

Figure 7B:
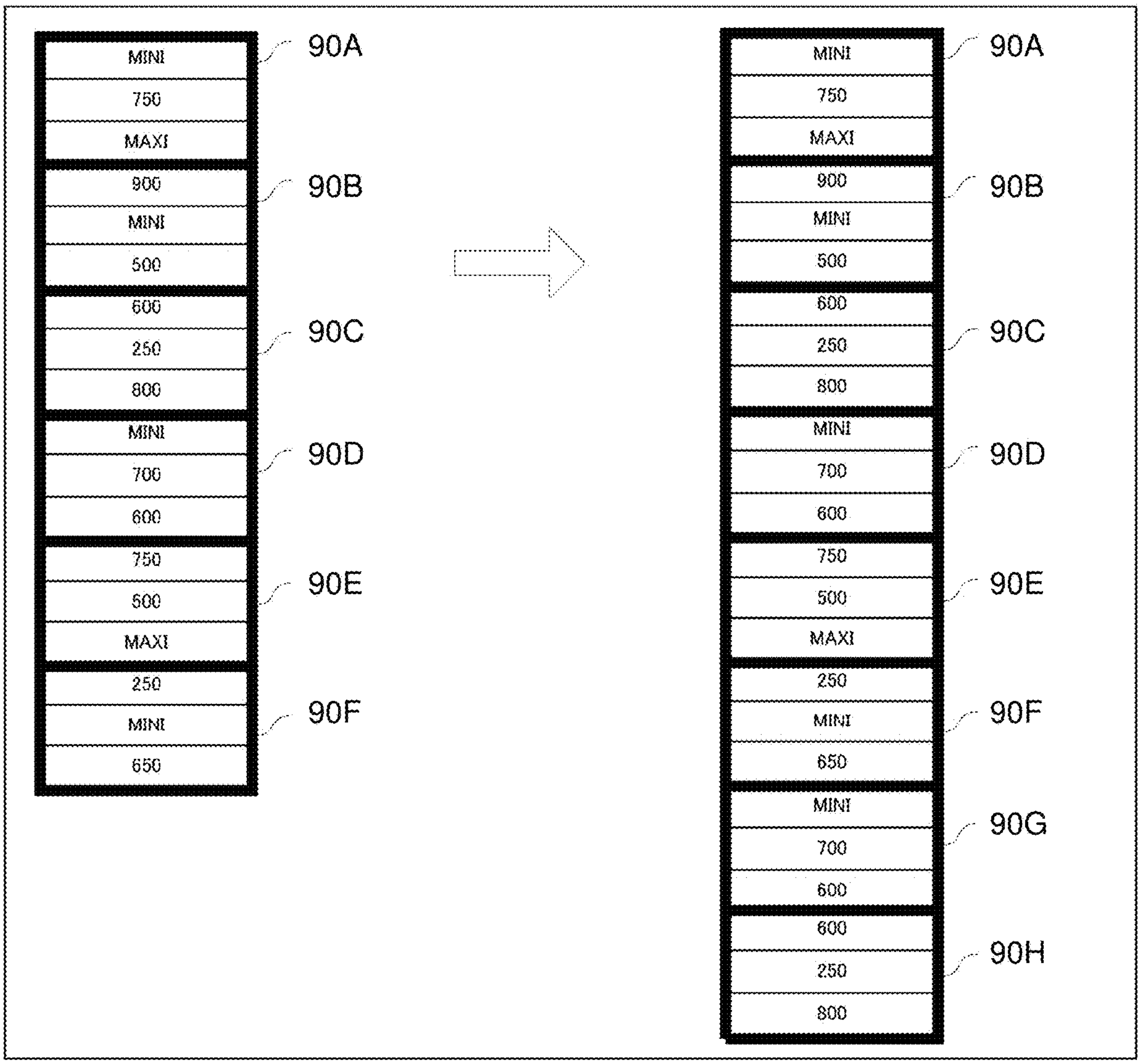
FIG. 7B is a diagrammatic illustration of a modification to a bonus reel strip, according to a second embodiment of the present invention.

In another embodiment, the number of segments in the reel strip 88 may be modified. For example, in FIG. 7B the segment reel strip 88 on the left includes six segments: 90A, 90B, 90C, 90D, 90E, 90F. In the modified segment reel strip 88 on the right, two additional segments 90G, 90H have been added.

It should also be noted that segments with different symbols in the respective segment symbol positions may be added or switched with existing segments. Further it should be noted that additional symbol positions may be also added to the segments and/or segments may be swapped or switched for existing segments that have a different number of symbol positions.

In one aspect of the present invention the reel strip 88 has a plurality of reel strip 88 position. Each segment symbol position is associated with one of the reel strip 88 symbol positions such that the symbols in all of the segments are associated with one of the reel strip 88 symbol positions. In other words, the reel strip 88 is composed of the segments laid end to end such that the number of reel symbol positions is equal to the sum of the number of segment reel positions in all of the segments (as shown in FIG. 4A).

In another aspect of the present invention, each segment is associated with only one of the reel strip 88 symbol positions. In other words, the segment symbol position associated with the reel symbol position is randomly determined. In one embodiment, the segment symbol position associated with a reel symbol position (and thus the symbol visible within the reel symbol position) is randomly determined. In some embodiment, the segment appears as a separate rotatable reel within the respective reel strip 88 symbol position. The separate rotatable reels may be spinning as the rotating selector device 80 rotates. The separate rotatable reels may start and/or stop spinning before, during or after the rotating selector device 80 starts spinning or stops spinning.

The outcome of the games is established as a function of symbol within the selected one of the symbol positions of the stop segment. In the illustrated embodiment, the player is awarded the award associated with the symbol within the selected one of the symbol positions of the stop segment.

Figure 8:
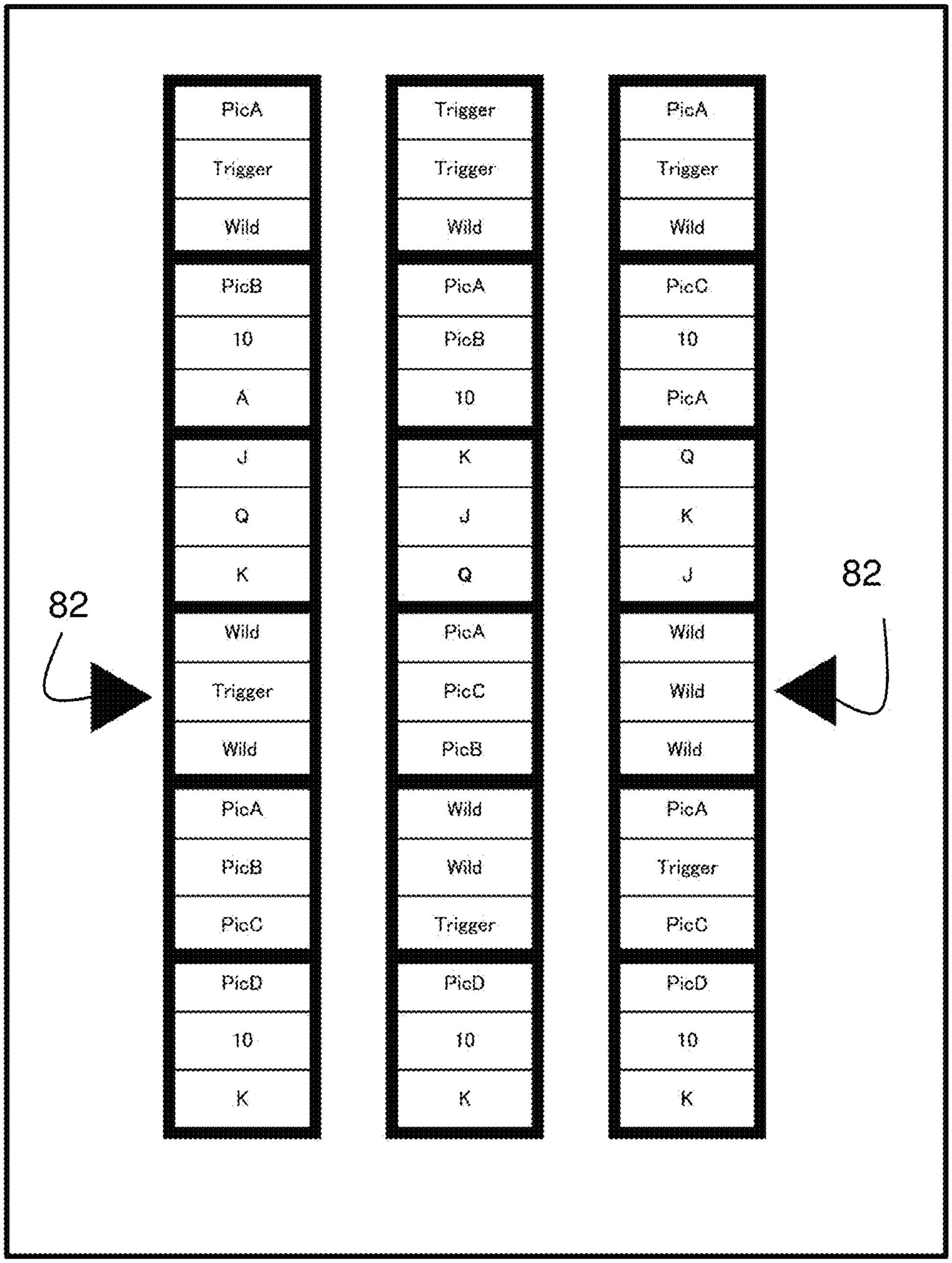
FIG. 8 is a diagrammatic illustration of a plurality of reel strips with segments, according to an embodiment of the present invention.

In another embodiment of the present invention with reference to FIG. 8, the grid 60 has more than one column. Each column has an associated reel strip 88. Each reel strip 88 may include a plurality of segments. Each reel strip 88 may stop as discussed above in response to actuation, by the player, of the spin/stop button 37. In one embodiment, the reels are stopped in response to a single actuation of the spin/stop button 37. In another embodiment, each reel strip 88 is stopped individually in response to separate actuation of the spin/stop button 37. The reels may form a video slot game in which an award is paid if a winning combination occurs in the outcome of the game across a pay line. As shown in FIG. 8 a horizontal pay line indicated by the two pointers may be used. It should be noted that the video slot game may include additional pay lines.

In one embodiment, the rotating selector device 80 is a reel as shown in the drawings. The reel may be a horizontal reel or a vertical reel. It should be noted that other types of rotating selector devices 80, such as a wheel or spinner, may also be used. Other types of rotating selector devices 80 are disclosed in commonly owned U.S. Pat. No. 8,882,574, issued Nov. 11, 2014, which is incorporated herein by reference.

In the illustrated embodiments, the rotating selector device 80 is displayed in the upper display 22. However, the rotating selector device 80 may also be displayed in the lower display 24 or across in the upper and lower displays 22, 24. In the latter embodiment, a portion of the rotating selector device 80 may be displayed in the upper display 22, and a portion of the rotating selector device 80 may be displayed in the lower display 24. The upper and lower displays 22 may be separated by an illumination device 44, under control of an illumination controller 42, that acts as the pointers 82.

In another aspect of the present invention, a control method for a gaming machine 10 to provide a game to a player is provided. The gaming machine 10 includes a control unit 50, an operation unit 36, and a display unit 28. The operation unit 36 is configured to receive an operation of a player. The display unit 28 is operably coupled to the operation unit and is configured to display a rotating selector device 80. The rotating selector device 80 includes a plurality of cells arranged in a grid 60. The grid 60 has a column and a plurality of rows. A reel strip 88 is associated with the column of the grid 60 and has a plurality of segments. Each segment has a plurality of segment symbol positions. Each segment symbol position has an associated symbol. The control unit 50 is operably coupled to the operation unit 36 and the display unit 28 and is configured to initiate a game in response to player operation and to establish an outcome of the game. The method includes the steps of: displaying and rotating the selector device in the grid such that symbols in the reel strip are displayed in the cells of the grid; receiving player input; establishing a stop segment of the reel as a function of a timing associated with the player input; randomly selecting one of the symbol positions of the stop segment; and, establishing an outcome of the game as a function of the selected one of the symbol positions of the stop segment; and, awarding a payout to the player as a function of the outcome of the game.

Figure 6A:
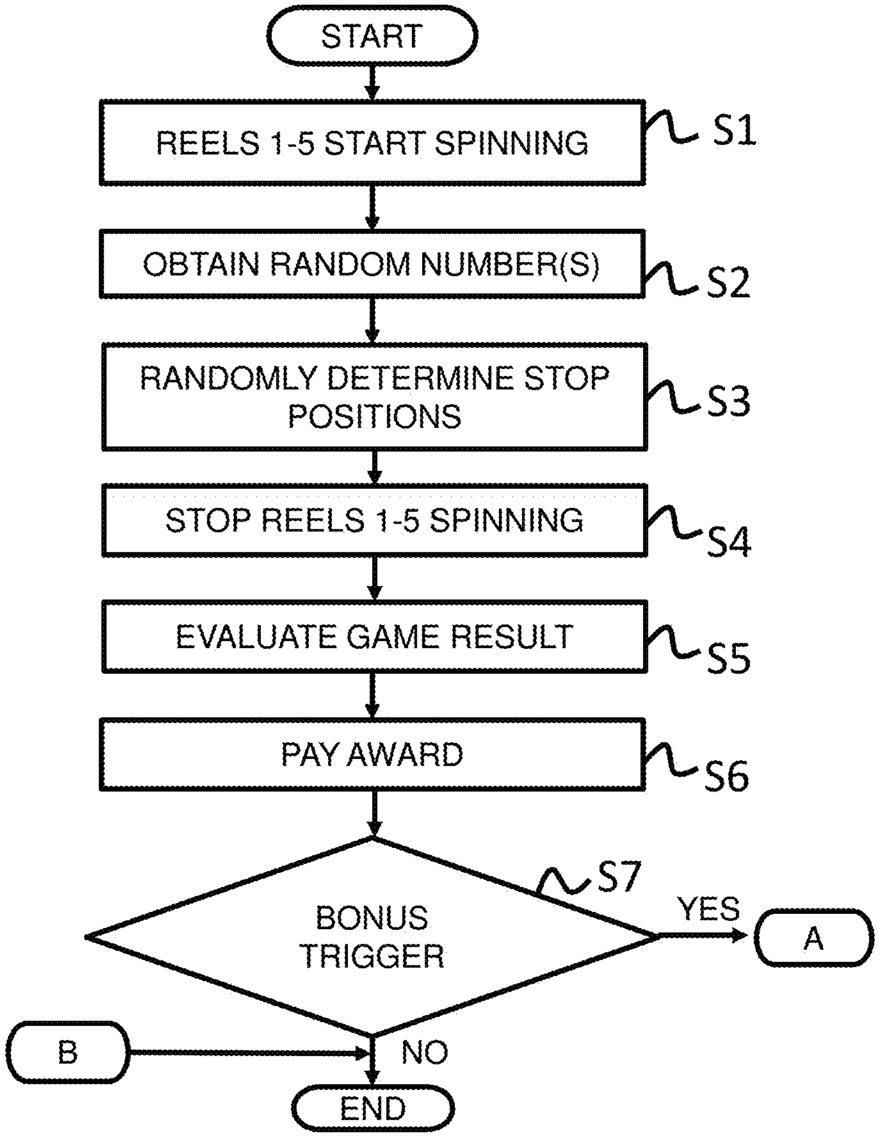
FIGS. 6A-6B are first and second portions of a flow chart describing the operation of the gaming machine in FIG. 1, according to one embodiment of the present invention.
Figure 6B:
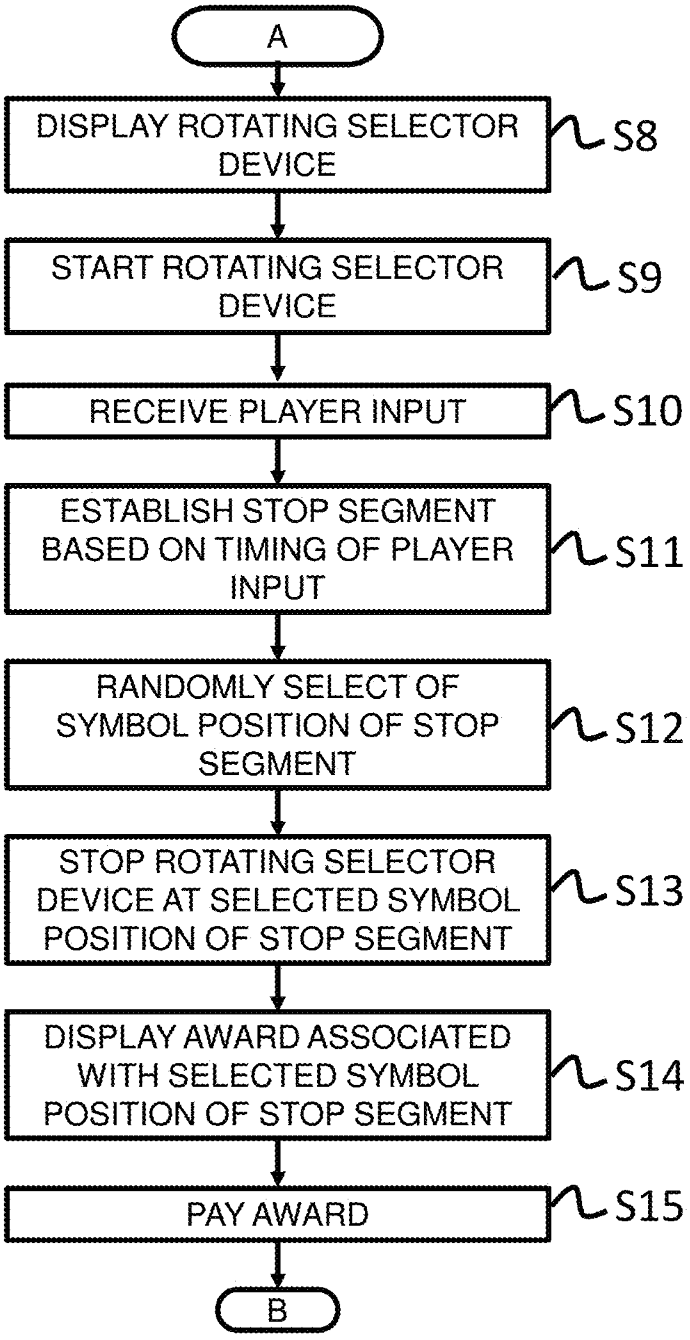

With reference to FIGS. 6A-6B an exemplary flow diagram of a method M10 for operating the gaming machine 10 is shown, according to an embodiment of the present invention.

In a first step S1, the reels start spinning. In a second step S2, a series of random numbers are generated. In the illustrated embodiment, the random numbers represent the stop position of each reel. In a third step S3, the stop position of each reel is determined as a function of the respective random number.

In a fourth step S4, the reels 1-5 stop spinning. In a fifth step S5, the outcome of the primary game, defined by the symbols shown in the grid after the reels stop spinning, is evaluated. If a winning condition has occurred in the outcome (as a function of the symbols in the outcome, one or more pay lines, and a pay table), an award for the primary game is paid in a sixth step.

In a seventh step S7, if a trigger condition (see above) has occurred, then the method M10 proceeds to an eighth step S8. Otherwise, the method M10 ends.

In the eighth step S8 the rotating selector device 80 is displayed. In a ninth step S9 the rotating selector device 80 starts spinning. When the player has actuated the spin/stop button 37 or touched the display screen in a tenth step S10, the stop segment is established based on the timing of the player input (see above) in an eleventh step S11. In a twelfth step S12, one of the symbol positions of the stop segment is randomly selected. The rotating selector device 80 is stopped at the selected symbol position of the stop segment in a thirteenth step S13.

After the rotating selector device 80 has stopped, then the award associated with the selected symbol position of the stop segment is displayed in a fourteenth step S14 and the award is paid in a fifteenth step S15.

Next, is a description of a program of the gaming machine 10 for operating one or a plurality of computers as the control unit 50. The gaming machine 10 stores the program in the memory, and can execute the program. The gaming machine 10 can access the program stored in the memory and can operate as the gaming machine 10 of the present embodiment by the program.

Further, the program according to the embodiment may be provided through a network or stored in a recording medium. Recording media such as a floppy (registered trademark) disk, CD-ROM, DVD, or ROM and the like, or semiconductor memory and the like are exemplified as a recording medium. In this case, a program stored in the memory uses a reading device inside the gaming machine 10 such as a floppy (registered trademark) disk drive device, CD-ROM drive device, and DVD drive device and the like.

The embodiments of the present invention are described above, but the present invention is not limited to such an embodiment, a variety of variations are possible.

In such an embodiment, a gaming machine 10 providing a game in the form of a slot machine is described, but this is not limited thereto, and a game in the state of poker, a video card game called black jack, bingo, keno, a wheel game and the like may be provided. Further, it is possible to apply the present invention to a pachinko machine or a pachinko slot machine.

Referring to FIG. 1, in one embodiment, referring to FIG. 1, the control panel 41 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 28 and/or the player tracking unit 57, the paper money/ticket identification unit 55, the operation unit 36, the player tracking unit 57, a coin slot, a ticket in ticket out (TITO) system, a bill acceptor, and/or any suitable device that enables the gaming machine 10 to receive media associated with a monetary value and establish a credit balance for use in playing the gaming machine. In one embodiment, the acceptor device may be configured to receive physical media such as, for example, a coin, a medal, a ticket, a card, a boll, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein. For example, in one embodiment, the coin slot may include an opening that is configured to receive coins and/or tokens deposited by the player into the gaming machine 10. The control unit 50 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

In the embodiment, determining the stop position of each reel is described as consecutively acquiring a random number that is used respectively, but the acquisition procedure of the random number is not limited to this. For example, when the game starts, the control unit 50 acquires these random numbers in a batch, and each random number may be stored in the storage area of the non-erasing memory 53 or the storage 54 when power failure occurs. In this type of situation, even when a power failure and the like occurs during a game, because the control unit 50 acquired the random number from the memory 53 or the storage 54 when the game started before the power failure occurred, when resuming the game after recovering from a power failure, the progress of the game can be reproduced. For example, when a game result obtaining a high payout is formed right before a power failure occurs, the player will be greatly dissatisfied if the progress of the game is not similar after recovering from a power failure. However, as mentioned above when the game starts all of the random numbers are acquired in a batch, and by saving these random numbers in the memory 53 or the storage 54, such great dissatisfaction can be avoided for the player because the progress of a game similar to before a power failure occurred can be reproduced after recovering from a power failure.

In another embodiment, the player may initiate a game through actuation of a spin button 37 (or other button). After initiation of the game, the control unit 50 randomly determines the step position of all reels. The control unit 50 may perform the check for the trigger condition before the reels stop spinning, and thus has already determined the outcome of the game. However, the control unit 50 displays the outcome of the game in a step by step process as discussed above. Further, if the trigger condition has occurred with respect to the columns in the left plurality of columns, the check and evaluation of the interim outcome with respect to the columns in the right plurality of columns should be performed in certain embodiments. For example, if the bonus game is provided that is triggered based on the interim outcome, the interim outcome must be established to perform such an evaluation.

Further, in the embodiment, a bill or ticket is displayed as game value, and received by these bill/ticket identification devices, and a form where a ticket is output by a printer unit is described, but the present invention is not limited to this. The game value is a concept including tangible objects such as a coin, bill, coin, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Further, set conditions providing a bonus or feature game are not limited to trigger determination or line determination, for example there may be a configuration providing a bonus game when the bet number surpasses a predetermined value. There could be a configuration providing a bonus game according to a value of the random number acquired during a regular game.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications. For instance, the present invention is applicable to a gaming system which is a combination of a community gaming system and individual gaming devices. In such a case, the individual gaming device and the community gaming device provide feature game cooperatively by providing 1st and 2nd feature display area on the community gaming system and 3rd feature display area on the individual gaming devices et al. And the predetermined symbol is copied from the 1st and 2nd feature display area on the community gaming system to 3rd feature display area on the individual gaming devices and the like.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine for displaying a computer-animated game, comprising:

a cabinet;

an operation unit mounted to the cabinet and including a spin button;

a display device mounted to the cabinet and including a touchscreen graphical user interface (GUI) displaying computer-animated images thereon; and a control unit operably coupled to the display device and the operation unit, the control unit including a memory device storing image data for rendering computer-animated images of the computer-animated game, and one or more processors programmed to execute an algorithm to display the computer-animated images of the computer-animated game on the touchscreen GUI including the steps of:

retrieving the stored image data from the memory device and rendering a game screen on the touchscreen GUI including a plurality of virtual reels displayed in a primary game grid;

detecting a first player operation of the spin button and responsively initiating a primary game by animating the plurality of virtual reels to simulate spinning and stopping the plurality of virtual reels; and detecting a trigger condition in the primary game and initiating an instance of a bonus game by animating a sequence of computer-generated images of the bonus game on the game screen including:

accessing a math model data file store in the memory device including computer readable instructions for generating a reel strip including a plurality of reel segments, each reel segment including a predetermined return-to-player value and a plurality of segment symbol positions associated with a corresponding symbol, each segment symbol position including an associated selection probability;

generating the reel strip based on the accessed math model data file;

rendering a bonus reel above the primary game grid including the generated reel strip and a pointer on the game screen, the bonus reel being displayed within a plurality of cells arranged in a bonus game grid having a single column, the bonus reel displaying the plurality of reel segments with each reel segment including a corresponding group of symbols;

animating the bonus reel to simulate the bonus reel spinning through the bonus game grid;

rendering a stop button icon on the touchscreen GUI;

receiving a second player operation via the touchscreen GUI indicating the player touching the stop button icon while the bonus reel is spinning and detecting a timing of the second player operation;

establishing a stop segment of the reel strip by selecting a reel segment from the plurality of reel segments based on a rotational speed of the bonus reel and the timing of the second player operation;

determining a selection probability associated with each symbol included in the stop segment and randomly selecting a symbol included in the selected stop segment; and animating the bonus reel to stop to display the randomly selected symbol adjacent to the pointer.

2. The gaming machine of claim 1, wherein the one or more processors is programmed to execute the algorithm including the steps of:

initiating a subsequent instance of the bonus game including modifying an aspect of the bonus reel.

3. The gaming machine of claim 2, wherein the one or more processors is programmed to execute the algorithm including the steps of:

modifying the aspect of the bonus reel including adjusting a number of segments included in the bonus reel.

4. The gaming machine of claim 2, wherein the one or more processors is programmed to execute the algorithm including the steps of:

modifying the aspect of the bonus reel including adjusting the rotational speed of the bonus reel.

5. The gaming machine of claim 1, wherein the one or more processors is programmed to execute the algorithm including the steps of:

rendering the stop button on the touchscreen GUI overlaying the primary game grid.

6. A method of operating a gaming machine for displaying a computer-animated game, the gaming machine including a cabinet, an operation unit mounted to the cabinet and including a spin button, a display device mounted to the cabinet and including a touchscreen graphical user interface (GUI) displaying computer-animated images thereon, and a control unit including a memory device storing image data for rendering computer-animated images of the computer-animated game and one or more processors operably coupled to the display device and the operation unit, the method including the one or more processors performing an algorithm to display the computer-animated images of the computer-animated game on the touchscreen GUI including the steps of:

retrieving the stored image data from the memory device and rendering a game screen on the touchscreen GUI including a plurality of virtual reels displayed in a primary game grid;

detecting a first player operation of the spin button and responsively initiating a primary game by animating the plurality of virtual reels to simulate spinning and stopping the plurality of virtual reels; and detecting a trigger condition in the primary game and initiating an instance of a bonus game by animating a sequence of computer-generated images of the bonus game on the game screen including:

accessing a math model data file store in the memory device including computer readable instructions for generating a reel strip including a plurality of reel segments, each reel segment including a predetermined return-to-player value and a plurality of segment symbol positions associated with a corresponding symbol, each segment symbol position including an associated selection probability;

generating the reel strip based on the accessed math model data file;

rendering a bonus reel above the primary game grid including the generated reel strip and a pointer on the game screen, the bonus reel being displayed within a plurality of cells arranged in a bonus game grid having a single column, the bonus reel displaying the plurality of reel segments with each reel segment including a corresponding group of symbols;

animating the bonus reel to simulate the bonus reel spinning through the bonus game grid;

rendering a stop button icon on the touchscreen GUI;

receiving a second player operation via the touchscreen GUI indicating the player touching the stop button icon while the bonus reel is spinning and detecting a timing of the second player operation;

establishing a stop segment of the reel strip by selecting a reel segment from the plurality of reel segments based on a rotational speed of the bonus reel and the timing of the second player operation;

determining a selection probability associated with each symbol included in the stop segment and randomly selecting a symbol included in the selected stop segment; and animating the bonus reel to stop to display the randomly selected symbol adjacent to the pointer.

7. The method of claim 6, including the one or more processors performing the algorithm including the steps of:

initiating a subsequent instance of the bonus game including modifying an aspect of the bonus reel.

8. The method of claim 7, including the one or more processors performing the algorithm including the steps of:

modifying the aspect of the bonus reel including adjusting a number of segments included in the bonus reel.

9. The method of claim 7, including the one or more processors performing the algorithm including the steps of:

modifying the aspect of the bonus reel including adjusting the rotational speed of the bonus reel.

10. The method of claim 6, including the one or more processors performing the algorithm including the steps of:

rendering the stop button on the touchscreen GUI overlaying the primary game grid.

11. A non-transitory computer-readable storage media having computer-executable instructions embodied thereon to operate a gaming machine for displaying a computer-animated game, the gaming machine including a cabinet, an operation unit mounted to the cabinet and including a spin button, a display device mounted to the cabinet and including a touchscreen graphical user interface (GUI) displaying computer-animated images thereon, and a control unit including a memory device storing image data for rendering computer-animated images of the computer-animated game and one or more processors operably coupled to the display device and the operation unit, when executed by the one or more processors the computer-executable instructions cause the one or more processors to perform an algorithm to display the computer-animated images of the computer-animated game on the touchscreen GUI including the steps of:

retrieving the stored image data from the memory device and rendering a game screen on the touchscreen GUI including a plurality of virtual reels displayed in a primary game grid;

detecting a first player operation of the spin button and responsively initiating a primary game by animating the plurality of virtual reels to simulate spinning and stopping the plurality of virtual reels; and detecting a trigger condition in the primary game and initiating an instance of a bonus game by animating a sequence of computer-generated images of the bonus game on the game screen including:

accessing a math model data file store in the memory device including computer readable instructions for generating a reel strip including a plurality of reel segments, each reel segment including a predetermined return-to-player value and a plurality of segment symbol positions associated with a corresponding symbol, each segment symbol position including an associated selection probability;

generating the reel strip based on the accessed math model data file;

rendering a bonus reel above the primary game grid including the generated reel strip and a pointer on the game screen, the bonus reel being displayed within a plurality of cells arranged in a bonus game grid having a single column, the bonus reel displaying the plurality of reel segments with each reel segment including a corresponding group of symbols;

animating the bonus reel to simulate the bonus reel spinning through the bonus game grid;

rendering a stop button icon on the touchscreen GUI;

receiving a second player operation via the touchscreen GUI indicating the player touching the stop button icon while the bonus reel is spinning and detecting a timing of the second player operation;

establishing a stop segment of the reel strip by selecting a reel segment from the plurality of reel segments based on a rotational speed of the bonus reel and the timing of the second player operation;

determining a selection probability associated with each symbol included in the stop segment and randomly selecting a symbol included in the selected stop segment; and animating the bonus reel to stop to display the randomly selected symbol adjacent to the pointer.

12. The non-transitory computer-readable storage media of claim 11, wherein the computer-executable instructions cause the one or more processors to perform the algorithm including the steps of:

initiating a subsequent instance of the bonus game including modifying an aspect of the bonus reel.

13. The non-transitory computer-readable storage media of claim 12, wherein the computer-executable instructions cause the one or more processors to perform the algorithm including the steps of:

modifying the aspect of the bonus reel including adjusting a number of segments included in the bonus reel.

14. The non-transitory computer-readable storage media of claim 12, wherein the computer-executable instructions cause the one or more processors to perform the algorithm including the steps of:

modifying the aspect of the bonus reel including adjusting the rotational speed of the bonus reel.

15. The non-transitory computer-readable storage media of claim 11, wherein the computer-executable instructions cause the one or more processors to perform the algorithm including the steps of:

rendering the stop button on the touchscreen GUI overlaying the primary game grid.

* * * * *